US010233949B2

(12) United States Patent
Versteyhe et al.

(10) Patent No.: US 10,233,949 B2
(45) Date of Patent: Mar. 19, 2019

(54) ACCUMULATOR ASSISTED HYDROSTATIC DRIVELINE AND OPTIMIZATION METHOD THEREOF

(71) Applicant: Dana Belgium N.V., Bruges (BE)

(72) Inventors: Mark R J Versteyhe, Oostkamp (BE); Mathieu P E Dutre, Varsenare (BE); Veerle Vandoorsselaere, Ghent (BE); Bart De Beer, Bruges (BE); Bruno Meertens, Loppem (BE); Thomas J. Vyncke, Deinze (BE); Jonas De Kooning, Ghent (BE)

(73) Assignee: Dana Belgium N.V., Brugge (BE)

( * ) Notice: Subject to any disclaimer, the term of this patent is extended or adjusted under 35 U.S.C. 154(b) by 160 days.

(21) Appl. No.: 15/356,092

(22) Filed: Nov. 18, 2016

(65) Prior Publication Data
US 2017/0067489 A1 Mar. 9, 2017

Related U.S. Application Data

(63) Continuation-in-part of application No. 13/425,531, filed on Mar. 21, 2012.
(Continued)

(51) Int. Cl.
*F15B 1/033* (2006.01)
*B60K 6/12* (2006.01)
*F16H 61/4096* (2010.01)

(52) U.S. Cl.
CPC .............. *F15B 1/033* (2013.01); *B60K 6/12* (2013.01); *F16H 61/4096* (2013.01); *Y02T 10/6208* (2013.01)

(58) Field of Classification Search
CPC ...................................... F15B 1/033
(Continued)

(56) References Cited

U.S. PATENT DOCUMENTS 4,679,396 A 7/1987 Heggie
4,754,603 A 7/1988 Rosman
(Continued)

FOREIGN PATENT DOCUMENTS

DE 2448723 4/1976
DE 102008021889 A1 5/2009
(Continued)

OTHER PUBLICATIONS

JHP4347058A, Dec. 1992, Japan, Okui, This is a human translation of this foreign document.*
(Continued)

*Primary Examiner* — Michael Leslie
*Assistant Examiner* — Matthew Wiblin
(74) *Attorney, Agent, or Firm* — Marshall & Melhorn, LLC

(57) ABSTRACT

A method for minimizing a fuel consumption rate of a vehicle and a method for tracking an optimal state of charge function for a hydrostatic accumulator are provided. The first method includes the steps of providing a motor and pump, determining an efficiency of the motor and pump using an efficiency map, providing a power source, and controlling the motor independent from the pump with a controller. The controller employs the efficiency of the motor and the pump to minimize the fuel consumption rate of the vehicle. The second method includes the steps of determining the optimal state of charge control function, calculating an optimal state of charge of the hydrostatic accumulator, determining a state of charge error, calculating a corrective value, and adjusting a state of a charge based on the corrective value and the state of charge error by adjusting the charge of the hydrostatic accumulator.

15 Claims, 9 Drawing Sheets

Related U.S. Application Data

(60) Provisional application No. 61/454,719, filed on Mar. 21, 2011.

(58) Field of Classification Search
USPC .......................................... 60/414, 416, 418
See application file for complete search history.

(56) References Cited

U.S. PATENT DOCUMENTS

| | | | |
|---|---|---|---|
| 5,495,912 A | 3/1996 | Gray, Jr. et al. | |
| 5,592,817 A | 1/1997 | Nishimura et al. | |
| 5,887,674 A * | 3/1999 | Gray, Jr. .................. | B60K 5/08 180/307 |
| 6,349,541 B1 | 2/2002 | Lisniansky | |
| 6,378,301 B2 * | 4/2002 | Endo .................... | E02F 9/2217 60/414 |
| 6,719,080 B1 | 4/2004 | Gray, Jr. | |
| 6,902,026 B2 | 6/2005 | Kinoshita et al. | |
| 6,971,463 B2 | 12/2005 | Shore et al. | |
| 7,100,723 B2 | 9/2006 | Roethler et al. | |
| 7,147,078 B2 | 12/2006 | Teslak et al. | |
| 7,669,414 B2 | 3/2010 | Loeffler | |
| 7,775,040 B2 * | 8/2010 | Khalil .................. | F15B 11/024 60/414 |
| 2006/0004509 A1 * | 1/2006 | Teslak ..................... | B60K 6/12 701/84 |
| 2007/0295543 A1 | 12/2007 | Fassnacht | |
| 2008/0276607 A1 | 11/2008 | Anderson et al. | |
| 2009/0008174 A1 * | 1/2009 | Tikkanen ................ | B60K 6/12 180/165 |
| 2009/0036248 A1 * | 2/2009 | Mueller .................. | B60K 6/12 475/72 |
| 2009/0210120 A1 | 8/2009 | Stein et al. | |
| 2009/0270221 A1 * | 10/2009 | Kovach .................... | B60K 6/12 477/3 |
| 2009/0308065 A1 | 12/2009 | Rea et al. | |
| 2010/0141024 A1 * | 6/2010 | Fouquet .................. | B60K 6/12 303/15 |
| 2010/0192563 A1 | 8/2010 | Rose et al. | |
| 2010/0217465 A1 | 8/2010 | Hoffmann | |

FOREIGN PATENT DOCUMENTS

| | | |
|---|---|---|
| JP | 4347058 | 12/1992 |
| JP | 6300113 | 10/1994 |
| WO | 88031123 | 5/1988 |
| WO | 2007071362 A1 | 6/2007 |
| WO | 2008033378 A1 | 3/2008 |
| WO | 2009065556 | 5/2009 |
| WO | 2009132765 | 11/2009 |

OTHER PUBLICATIONS

Zbigniew Pawelski and Sebastian Wittich; int. J. Vehicle Design, vol. 38, Nos. 2/3, 2005, pp. 150-161.

M.P. O'Keefe and T. Markel; Dynamic Programming Applied to Investigate Energy Management Strategies for a Plug-in HEV; Presented at the 22nd Intn'l Battery, Hybrid and Fuel Cell Electric Vehicle Symposium and Exhibition Nov. 2006.

Ximing Wang, Hongwen He, Fengchun Sun and Jieli Zhang; Application Study on the Dynamic Programming Algorithm for Energy Management of Plug-in Hybrid Electric Vehicles; Energies 2015.

* cited by examiner

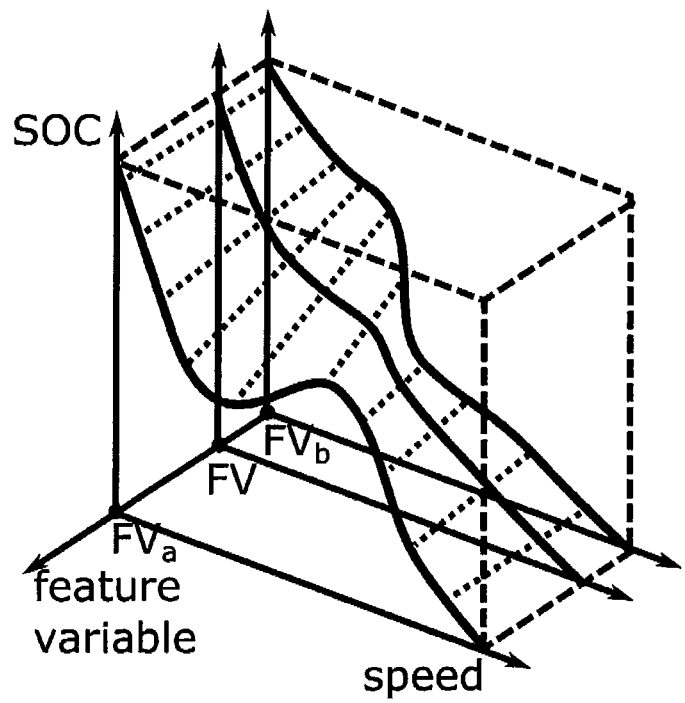
Figure 12: Interpolation of the SOC curves between feature variables
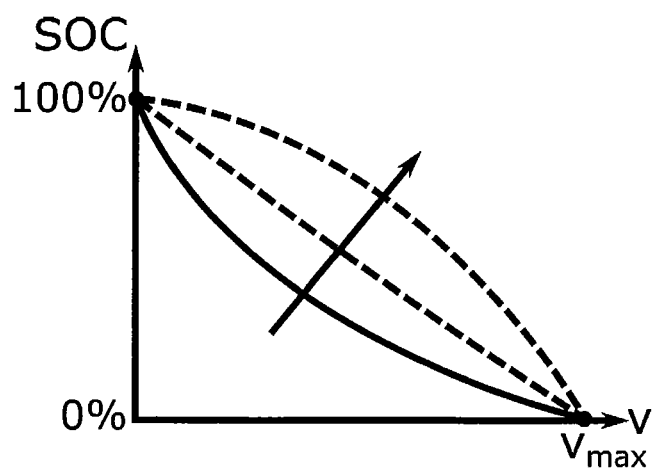
Figure 13: Adaptation of a limited variable SOC function

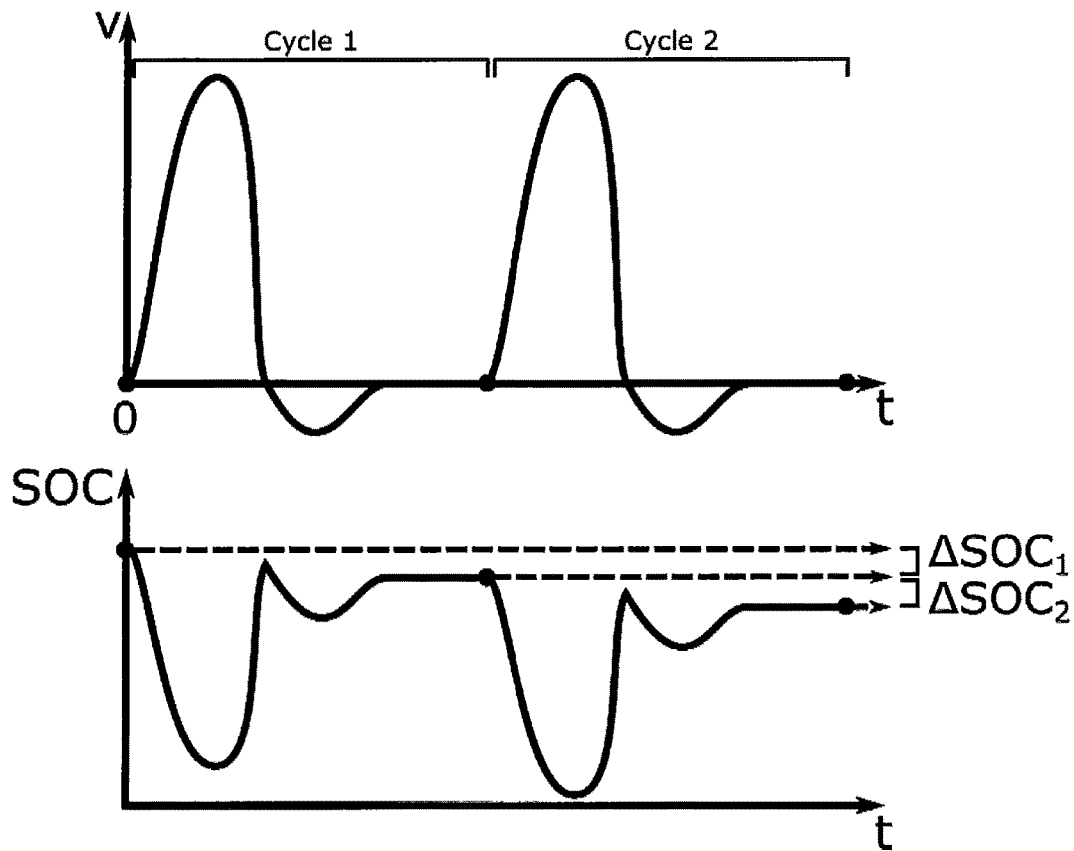
Figure 14: Repeating duty cycle SOC analysis
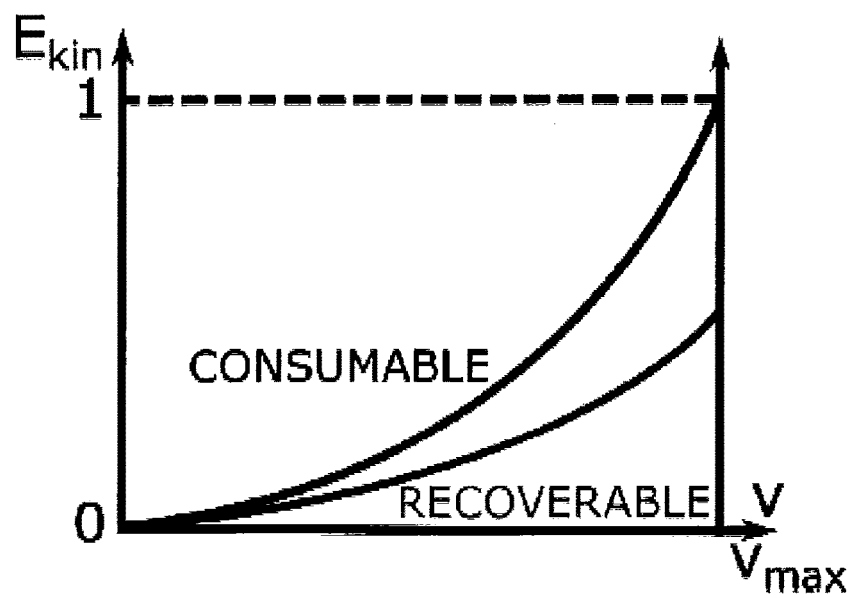
Figure 15 : Consumable and recoverable kinetic energy in function of vehicle speed

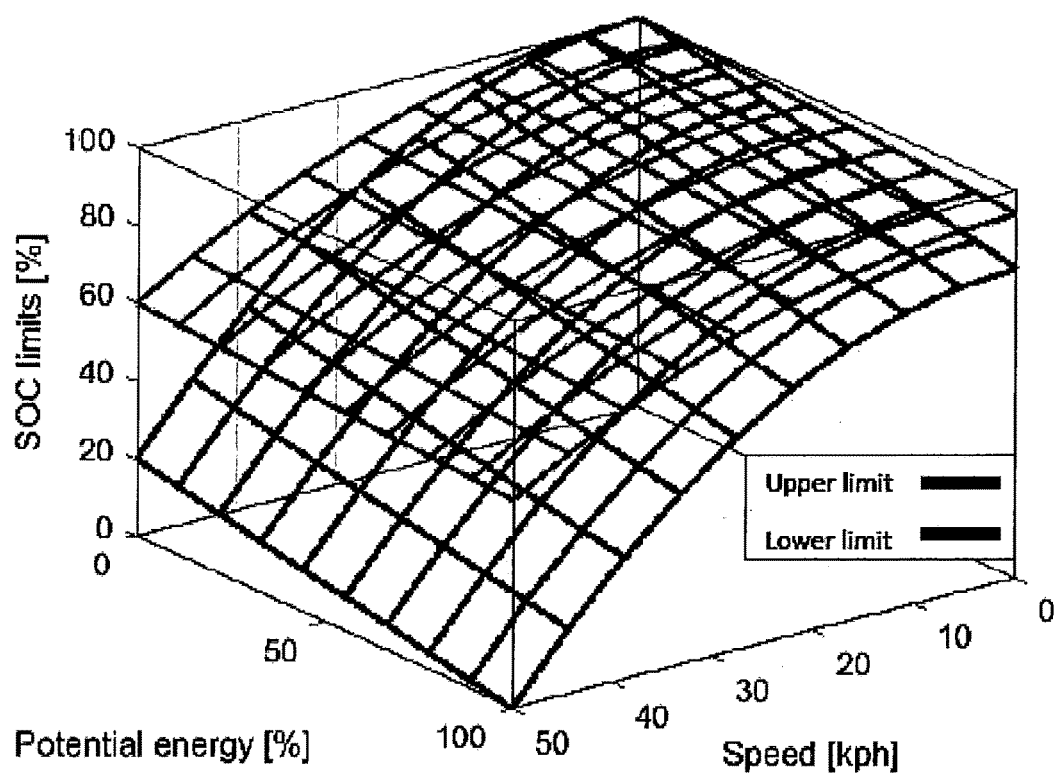
Figure 16: SOC charge function upper and lower limits

ACCUMULATOR ASSISTED HYDROSTATIC DRIVELINE AND OPTIMIZATION METHOD THEREOF

CLAIM OF PRIORITY

The present application is a continuation-in-part application of U.S. patent application Ser. No. 13/425,531 filed on Mar. 21, 2012 and currently pending. U.S. patent application Ser. No. 13/425,531 claims the benefit of priority to U.S. Provisional Application No. 61/454,719 filed on Mar. 21, 2011. The content of the above-noted patent applications are hereby expressly incorporated by reference into the detailed description of the present application.

FIELD

The present disclosure relates to hydrostatic drivelines including accumulators and methods for optimizing the operation thereof.

BACKGROUND

Vehicles incorporating a conventional hydrostatic driveline have many benefits over vehicles having a conventional driveline. Such vehicles having the conventional hydrostatic driveline may be well suited for tasks such as pushing loads, lifting loads, or digging, for example. The conventional hydrostatic driveline may provide the vehicle with a high torque output, excellent response to input from an operator, and the ability to power actuators and equipment that may be attached to the vehicle. However, the conventional hydrostatic driveline may result in the vehicle being inefficient, restricted to a narrow speed range, and including specialized, expensive components.

Typically, the conventional hydrostatic driveline is driven by an internal combustion engine. The internal combustion engine is selected to accommodate a peak power demand of the vehicle. Accordingly, the internal combustion engine is oversized for a majority of tasks required of the vehicle, such as moving when the vehicle is in an unloaded state or light tasks. Losses may also be incurred in the conventional hydrostatic driveline itself, through inefficiencies that may be present in hydraulic pumps or other components. Because the internal combustion engine is typically oversized and losses are typically present in the conventional hydrostatic driveline, an efficiency of the vehicle may be compromised.

The high torque output that accompanies the conventional hydrostatic driveline may restrict the vehicle to the narrow speed range. The narrow speed range may be advantageous for the specialized tasks the conventional hydrostatic driveline is well suited for, but such a speed range may severely restrict the vehicle. Traversing long distances for the vehicle may limit productivity and result in dissatisfaction of the operator.

The conventional hydrostatic driveline may include specialized, expensive components, such as large hydraulic pumps, motors, and valving systems manufactured in small quantities. Inclusion of such components in the conventional hydrostatic driveline may greatly increase an initial cost of the vehicle. Further and as a result, a service cost associated with the vehicle may increase greatly. The conventional hydrostatic driveline including specialized, expensive components may greatly increase purchase and maintenance costs of the vehicle.

It would be advantageous to develop a hydrostatic driveline for a vehicle that is efficient, may be operated at a wide range of speeds, and is comprised of components which are easily procured and serviced.

SUMMARY

Presently provided by the disclosure, a hydrostatic driveline for a vehicle that is efficient, may be operated at a wide range of speeds, and is comprised of components which are easily procured and serviced, has surprisingly been discovered.

In one embodiment, the present disclosure is directed to a method for minimizing a fuel consumption rate of a vehicle having a hydrostatic driveline. The method including the steps of providing a variable displacement motor, determining an efficiency of the variable displacement motor using an efficiency map, providing a variable displacement pump, determining an efficiency of the variable displacement pump using an efficiency map, providing a power source, a capacity of the power source based on a desired power output of the vehicle, an efficiency of the variable displacement motor, and an efficiency of the variable displacement pump, providing a controller, and controlling a fluid displacement and an output pressure of the motor independent of a fluid displacement of the pump with the controller. The controller employs the efficiency of the motor and the efficiency of the pump to minimize the fuel consumption rate of the vehicle.

In another embodiment, the present disclosure is directed to a method for determining an optimal state of charge control function for a hydrostatic accumulator and employing a control system to adjust a state of charge of the hydrostatic accumulator to track the optimal state of charge. The method includes the steps of providing a hydrostatic driveline for a vehicle including a power source, a pump drivingly engaged with the power source, a motor, and the hydrostatic accumulator, and the pump, the motor, and the hydrostatic accumulator forming a portion of a fluidic circuit, providing a controller in communication with a plurality of inputs, determining the optimal state of charge control function using the controller wherein the controller compares at least one of the plurality of inputs to at least one of a plurality of inputs of a optimal state of charge control function look-up table, calculating an optimal state of charge of the hydrostatic accumulator using the optimal state of charge control function and the plurality of inputs, comparing the state of charge of the hydrostatic accumulator to the optimal state of charge as calculated using the optimal state of charge control function to determine a state of charge error, calculating a corrective value for the state of charge using the state of charge error, and the plurality of inputs, and adjusting a state of charge of the hydrostatic accumulator based on the corrective value and the state of charge error, the state of charge of the hydrostatic accumulator adjusted by charging the hydrostatic accumulator using one of the pump and the motor or discharging the hydrostatic accumulator.

In another embodiment, the present disclosure is directed to a method for determining an optimal state of charge control function for a hydrostatic accumulator and employing a control system to adjust a state of charge of the hydrostatic accumulator to track the optimal state of charge function. The method includes the steps of providing a hydrostatic driveline for a vehicle including a power source, a pump drivingly engaged with the power source, a motor, and the hydrostatic accumulator, and the pump, the motor, and the hydrostatic accumulator forming a portion of a fluidic circuit, providing a controller in communication with a plurality of inputs, determining the optimal state of charge control function using the controller wherein the controller uses adaptive control based on changes in the state of charge of the hydrostatic driveline during a cycle of operation of the driveline to determine the optimal state of charge control function, calculating an optimal state of charge of the hydrostatic accumulator using the optimal state of charge control function and the plurality of inputs, comparing the state of charge of the hydrostatic accumulator to the optimal state of charge as calculated using the optimal state of charge control function to determine a state of charge error, calculating a corrective value for the state of charge using the state of charge error, and the plurality of inputs, and adjusting a state of charge of the hydrostatic accumulator based on the corrective value and the state of charge error, the state of charge of the hydrostatic accumulator adjusted by charging the hydrostatic accumulator using one of the pump and the motor or discharging the hydrostatic accumulator.

In another embodiment, the present disclosure is directed to a method for determining an optimal state of charge control function for a hydrostatic accumulator and employing a control system to adjust a state of charge of the hydrostatic accumulator to track the optimal state of charge function. The method includes the steps of providing a hydrostatic driveline for a vehicle including a power source, a pump drivingly engaged with the power source, a motor, and the hydrostatic accumulator, and the pump, the motor, and the hydrostatic accumulator forming a portion of a fluidic circuit, providing a controller in communication with a plurality of inputs, determining the optimal state of charge control function with using the controller wherein the controller uses upper and lower limits of available energy of the hydrostatic driveline to calculate the optimal state of charge control function, calculating an optimal state of charge of the hydrostatic accumulator using the optimal state of charge control function and the plurality of inputs, comparing the state of charge of the hydrostatic accumulator to the optimal state of charge as calculated using the optimal state of charge control function to determine a state of charge error, calculating a corrective value for the state of charge using the state of charge error, and the plurality of inputs, and adjusting a state of charge of the hydrostatic accumulator based on the corrective value and the state of charge error, the state of charge of the hydrostatic accumulator adjusted by charging the hydrostatic accumulator using one of the pump and the motor or discharging the hydrostatic accumulator.

Various aspects of this disclosure will become apparent to those skilled in the art from the following detailed description of the preferred embodiment, when read in light of the accompanying drawings.

BRIEF DESCRIPTION OF THE DRAWINGS

The above, as well as other advantages of the present disclosure, will become readily apparent to those skilled in the art from the following detailed description when considered in the light of the accompanying drawings in which:

FIG. 12 is a graph illustrating an example of interpolation of state of charge curves in a look-up table for one embodiment of the present disclosure;

FIG. 13 is a graph illustrating a limited variable state of charge control function for one example of a duty cycle for one embodiment of the present disclosure;

FIG. 14 is a graph illustrating the state of charge as a function of time over a repeating duty cycle for one embodiment of the present disclosure;

FIG. 15 is a graph illustrating the amount of consumable and recoverable kinetic energy available as a function of vehicle speed for one embodiment of the present disclosure; and FIG. 16 is a graph illustrating upper and lower limits of a state of charge control function for one embodiment of the present disclosure.

DETAILED DESCRIPTION OF THE PREFERRED EMBODIMENTS

It is to be understood that the disclosure may assume various alternative orientations and step sequences, except where expressly specified to the contrary. It is also to be understood that the specific devices and processes illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise.

Figure 1:
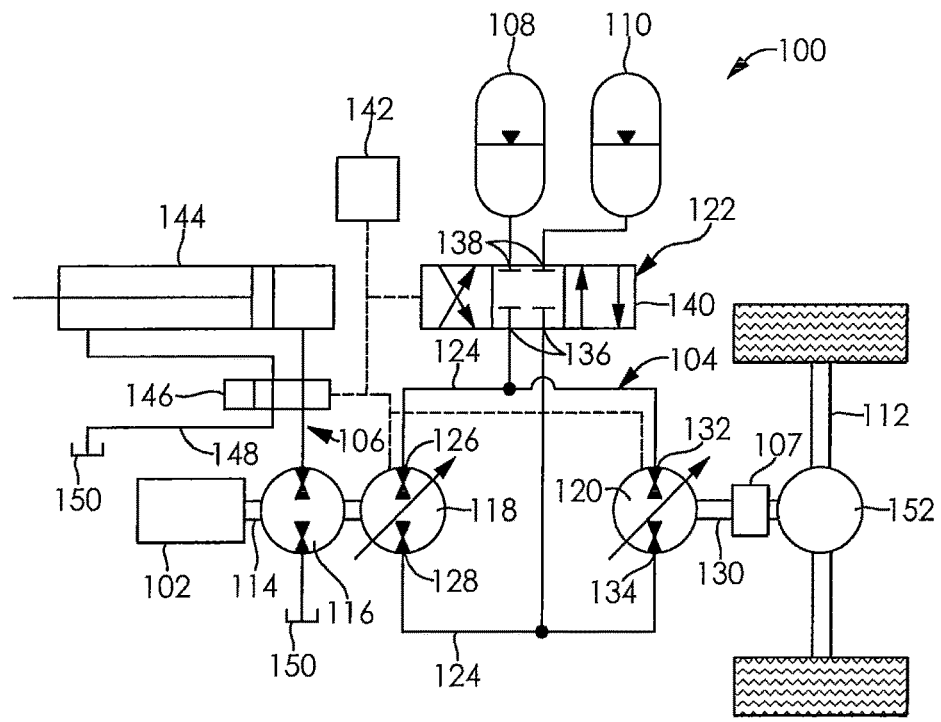
FIG. 1 is a schematic view of a hydrostatic driveline for a vehicle according to an embodiment of the present disclosure.

FIG. 1 illustrates a hydrostatic driveline 100 according to an embodiment of the present disclosure. The hydrostatic driveline 100 includes a power source 102, a drive circuit 104, an auxiliary circuit 106, a transmission 107, a first fluid accumulator 108, a second fluid accumulator 110, and a drive axle 112. The hydrostatic driveline 100 forms a portion of a vehicle (not shown); however, the hydrostatic driveline 100 may be used in other applications. The power source 102 and the drive axle 112 are drivingly engaged with the drive circuit 104. Further, the power source 102 is drivingly engaged with the auxiliary circuit 106. The first fluid accumulator 108 and the second fluid accumulator 110 are in fluid communication with the drive circuit 104.

The power source 102 is an internal combustion engine as is known in the art. However, it is understood the power source 102 may be another type of power source such as an electric motor, for example. The power source 102 rotates a first drive shaft 114. The first drive shaft 114 is drivingly engaged with a fixed displacement pump 116 of the auxiliary circuit 106 and a variable displacement pump 118 of the drive circuit 104. A transmission (not shown) or a clutching device (not shown) may be disposed on the first drive shaft 114 to permit selective engagement of the power source 102 with one or both of the fixed displacement pump 116 and the variable displacement pump 118. Further, the transmission or the clutching device may be used to modify a characteristic of a power transferred from the power source 102 to the auxiliary circuit 106 and the drive circuit 104. Transmission or clutching devices may be also used to selectively engage the auxiliary circuit 106 with the drive circuit 104.

The drive circuit 104 includes the variable displacement pump 118, a variable displacement motor 120, a directional valve 122, and a plurality of drive fluid conduits 124. It is understood that the terms fixed displacement pump and fixed displacement motor describe a fluid power device that may be operated as either a pump or a motor, depending on an input power provided thereto. Further, it is also understood that the terms variable displacement pump and variable displacement motor describe a fluid power device that may be operated as either a pump or a motor, depending on an input power provided thereto.

The variable displacement pump 118 is a hydraulic axial piston pump having a movable swashplate (not shown). However, it is understood the variable displacement pump 118 may be any other type of variable displacement pump 118. The variable displacement pump 118 is drivingly engaged with the power source 102 through the first drive shaft 114. A first fluid port 126 of the variable displacement pump 118 is in fluid communication with a first portion of the plurality of drive fluid conduits 124. A second fluid port 128 of the variable displacement pump 118 is in fluid communication with a second portion of the plurality of drive fluid conduits 124.

The variable displacement motor 120 is a hydraulic axial piston motor having a movable swashplate (not shown). However, it is understood the variable displacement motor 120 may be any other type of variable displacement motor. The variable displacement motor 120 is drivingly engaged with the drive axle 112 through a second drive shaft 130. A first fluid port 132 of the variable displacement motor 120 is in fluid communication with the first portion of the plurality of drive fluid conduits 124. A second fluid port 134 of the variable displacement motor 120 is in fluid communication with the second portion of the plurality of drive fluid conduits 124.

The directional valve 122 is a three position, four way directional valve as is known in the art; however, it is understood the directional valve 122 may be any other fluid control valve. The directional valve 122 includes two circuit ports 136, two accumulator ports 138, and a sliding spool 140. The directional valve is in fluid communication with the first portion of the plurality of drive fluid conduits 124, the second portion of the plurality of drive fluid conduits 124, the first fluid accumulator 108, and the second fluid accumulator 110. A controller 142 in communication with the directional valve 122 is used to change a position of the directional valve 122.

The plurality of drive fluid conduits 124 are conduits used in hydraulic power systems as is known in the art. The plurality of drive fluid conduits 124 may include flexible conduits, rigid conduits, or conduits formed within other components of the hydrostatic driveline 100. The plurality of drive fluid conduits 124 includes the first portion of the plurality of drive fluid conduits 124 and the second portion of the plurality of drive fluid conduits 124. The first portion of the plurality of drive fluid conduits 124 is in fluid communication with the variable displacement pump 118 through the first fluid port 126 thereof, the variable displacement motor 120 through the first fluid port 132 thereof, and one of the circuit ports 136 of the directional valve 122. The second portion of the plurality of drive fluid conduits 124 is in fluid communication with the variable displacement pump 118 through the second fluid port 128 thereof, the variable displacement motor 120 through the second fluid port thereof 134, and the remaining circuit port 136 of the directional valve 122.

The auxiliary circuit 106 includes the fixed displacement pump 116, an actuator 144, an auxiliary directional valve 146, and a plurality of auxiliary fluid conduits 148.

The fixed displacement pump 116 may be a gear pump, a screw pump, a rotary vane pump, or any other type of fixed displacement pump. Further, it is understood that a variable displacement pump may be used instead of the fixed displacement pump 116. When the variable displacement pump is used instead of the fixed displacement pump, the variable displacement pump is a hydraulic axial piston pump having a movable swashplate. However, it is understood the variable displacement pump may be any other type of variable displacement pump. The fixed displacement pump 116 is drivingly engaged with the power source 102 through the first drive shaft 114. The fixed displacement pump 116 is in fluid communication with the auxiliary directional valve 146 and a fluid reservoir 150.

The actuator 144 is a hydraulic cylinder; however, it is understood that the actuator 144 may be a plurality of hydraulic cylinders, a hydraulic motor, or any other device powered by a pressurized fluid. The actuator 144 is in fluid communication with the auxiliary directional valve 146. Typically, the actuator 144 engages a movable portion of the vehicle to facilitate the movement of a load. However, it is understood that the actuator 144 may be used in other ways. For example, the actuator 144 can be used to move auxiliary attachments including, but not limited to, a bucket of a front-end loader, a shovel of a back-hoe loader, or a boom of a teleboom handler.

The auxiliary directional valve 146 is a three position, four way directional valve as is known in the art; however, it is understood the directional valve 146 may be any other fluid control valve. The auxiliary directional valve 146 is in fluid communication with the fixed displacement pump 116, the actuator 144, and the fluid reservoir 150. The controller 142 in communication with the auxiliary directional valve 146 is used to change a position of the auxiliary directional valve 146.

The plurality of auxiliary fluid conduits 148 are conduits used in hydraulic power systems as is known in the art. The plurality of auxiliary fluid conduits 148 may include flexible conduits, rigid conduits, or conduits formed within other components of the hydrostatic driveline 100. The plurality of auxiliary fluid conduits 148 enables the auxiliary directional valve 146 to communicate with the fluid reservoir 150, the fixed displacement pump 116, and the actuator 144.

The transmission 107 is drivingly disposed between the second drive shaft 130 and the differential 152 to modify a characteristic of the power transferred from the variable displacement motor 120 to the drive axle 112. The transmission 107 may be one of an automatic transmission, a manual transmission, and a continuously variable transmission and is used to increase a drive ratio range of the hydrostatic driveline 100. Further, it is understood that hydrostatic driveline 100 may not include the transmission 107.

The first fluid accumulator 108 is an accumulator as is known in the art. The first fluid accumulator 108 is a hollow vessel in fluid communication with one of the accumulator ports 138 of the directional valve 122. A quantity of gas within the first fluid accumulator 108 is compressed when hydraulic fluid enters the first fluid accumulator 108. The first fluid accumulator 108 may be configured for operation within a particular pressure range. While not shown, the first fluid accumulator 108 may also be fitted with a flush valve (for draining the first fluid accumulator 108 to the fluid reservoir 150), a pressure relief valve (for draining the first fluid accumulator 108 to the fluid reservoir 150), a proportional valve (for cooperating with the directional valve 122 for fluidly connecting the first fluid accumulator 150 to the drive circuit 104), and a pilot valve (for providing fluid pressure to the directional valve 122). The controller 142 in communication with the flush valve, the proportional valve, and the pilot valve is used to change a position of the flush valve, the proportional valve, and the pilot valve.

The second fluid accumulator 110 is an accumulator as is known in the art. The second fluid accumulator 110 is a hollow vessel in fluid communication with a remaining accumulator port 138 of the directional valve 122. A quantity of gas within the second fluid accumulator 110 is compressed when hydraulic fluid enters the second fluid accumulator 110. The second fluid accumulator 110 may be configured for operation within a particular pressure range. While not shown, the second fluid accumulator 110 may also be fitted with a flush valve (for draining the second fluid accumulator 110 to the fluid reservoir 150), a pressure relief valve (for draining the second fluid accumulator 110 to the fluid reservoir 150), a proportional valve (for cooperating with the directional valve 122 for fluidly connecting the first fluid accumulator 150 to the drive circuit 104), and a pilot valve (for providing fluid pressure to the directional valve 122). The controller 142 in communication with the flush valve, the proportional valve, and the pilot valve is used to change a position of the flush valve, the proportional valve, and the pilot valve.

The drive axle 112 is a shaft driven axle as is known in the art. The drive axle 112 is drivingly engaged with the variable displacement motor through the second drive shaft 130 and a differential 152; however, it is understood the variable displacement motor may directly drive the differential 152 or an axle of the vehicle the drive axle 112 is incorporated in.

Figure 2:
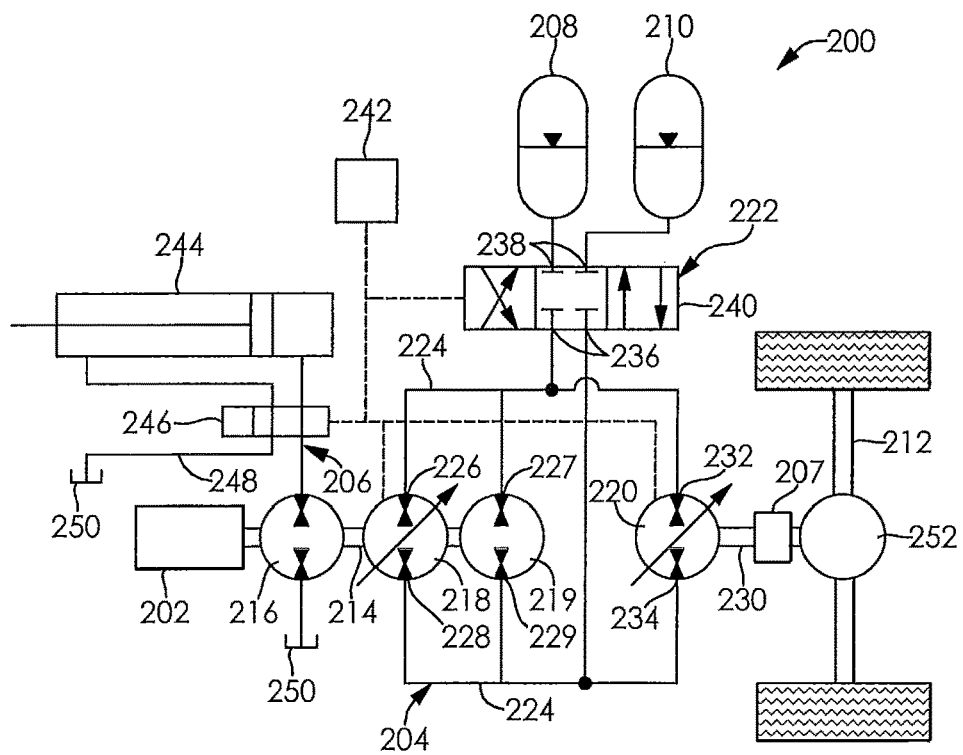
FIG. 2 is a schematic view of a hydrostatic driveline for a vehicle according to another embodiment of the present disclosure.

FIG. 2 shows a portion of an alternative embodiment of the hydrostatic driveline 100. A hydrostatic driveline 200 shown in FIG. 2 includes a power source 202, a drive circuit 204, an auxiliary circuit 206, a transmission 207, a first fluid accumulator 208, a second fluid accumulator 210, and a drive axle 212. Similar structural features of the hydrostatic driveline 100 are similarly referenced, with the exception of the below identified features.

The drive circuit 204 includes a first fixed displacement pump 216, a variable displacement pump 218, a second fixed displacement pump 219, a variable displacement motor 220, a directional valve 222, and a plurality of drive fluid conduits 224. The variable displacement pump 218 and the second fixed displacement pump 219 cooperate to pump a variable amount of hydraulic fluid within a predetermined range through the drive circuit 204.

The second fixed displacement pump 219 of the drive circuit 204 may be a gear pump, a screw pump, a rotary vane pump, or any other type of fixed displacement pump. The second fixed displacement pump 219 is drivingly engaged with the power source 202 through a first drive shaft 214. A first fluid port 227 of the second fixed displacement pump 219 is in fluid communication with a first portion of the plurality of drive fluid conduits 224. A second fluid port 229 of the second fixed displacement pump 219 is in fluid communication with a second portion of the plurality of drive fluid conduits 224.

Figure 3:
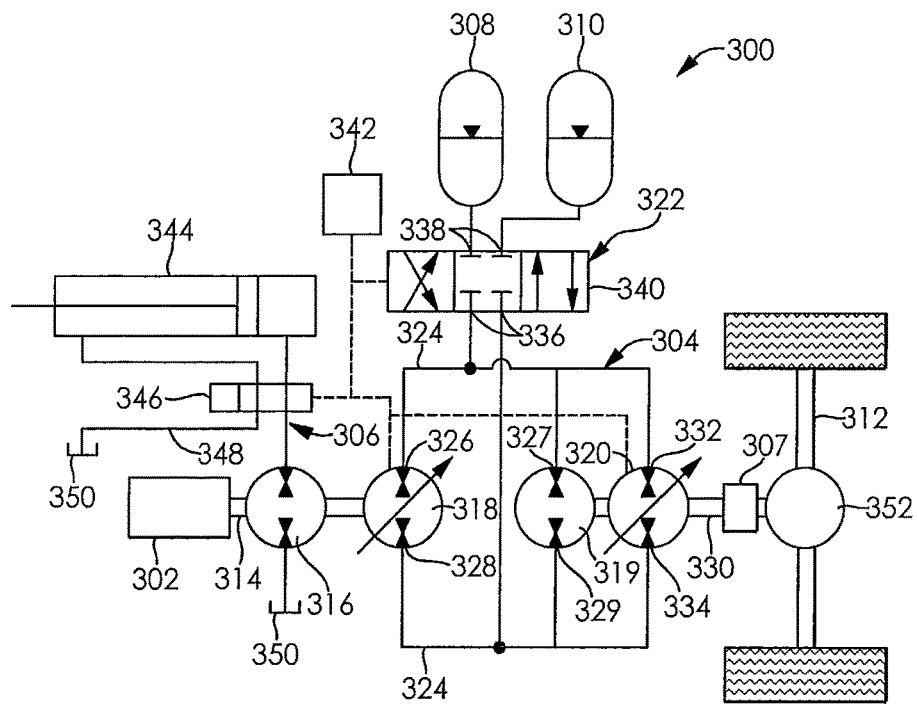
FIG. 3 is a schematic view of a hydrostatic driveline for a vehicle according to another embodiment of the present disclosure.

FIG. 3 shows a portion of an alternative embodiment of the hydrostatic driveline 100. A hydrostatic driveline 300 shown in FIG. 3 includes a power source 302, a drive circuit 304, an auxiliary circuit 306, a transmission 307, a first fluid accumulator 308, a second fluid accumulator 310, and a drive axle 312. Similar structural features of the hydrostatic driveline 100 are similarly referenced, with the exception of the below identified features.

The drive circuit 304 includes a variable displacement pump 318, a fixed displacement motor 319, a variable displacement motor 320, a directional valve 322, and a plurality of drive fluid conduits 324. The fixed displacement motor 319 and the variable displacement motor 320 cooperate to pump a variable amount of hydraulic fluid within a predetermined range to drive the drive axle 312.

The fixed displacement motor 319 of the drive circuit 304 may be a gear motor, a screw motor, a rotary vane motor, or any other type of fixed displacement motor. The fixed displacement motor 319 is drivingly engaged with the drive axle 312 through a second drive shaft 330. A first fluid port 327 of the fixed displacement motor 319 is in fluid communication with a first portion of the plurality of drive fluid conduits 324. A second fluid port 329 of the fixed displacement motor 319 is in fluid communication with a second portion of the plurality of drive fluid conduits 324.

Figure 4:
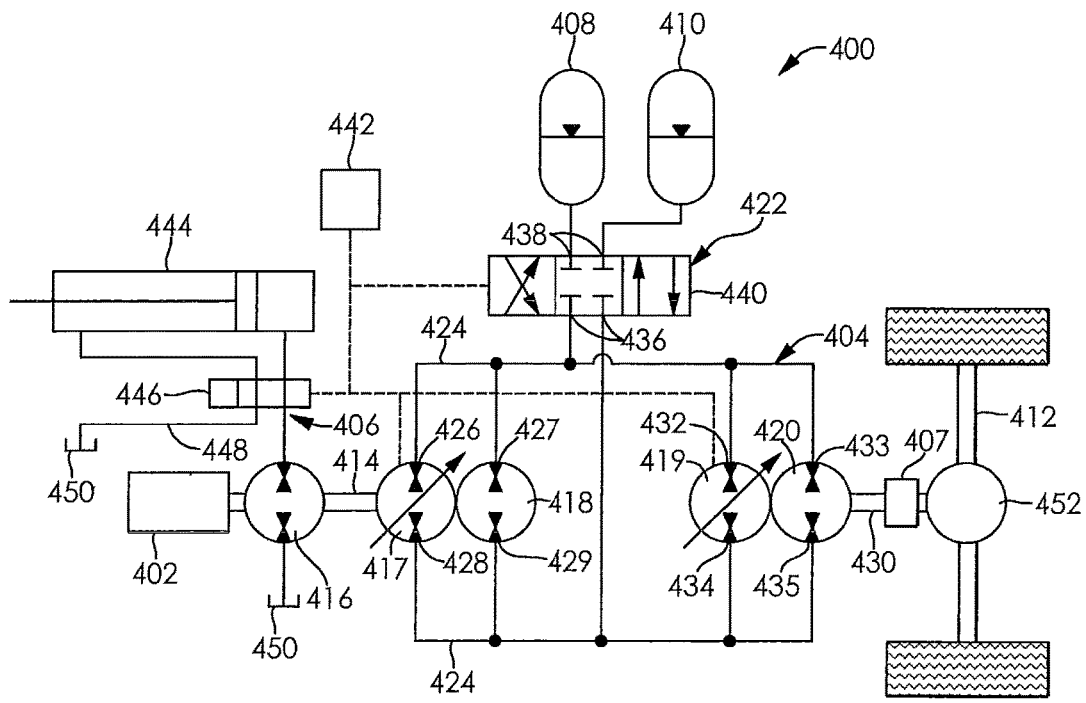
FIG. 4 is a schematic view of a hydrostatic driveline for a vehicle according to another embodiment of the present disclosure.

FIG. 4 shows a portion of an alternative embodiment of the hydrostatic driveline 100. The hydrostatic driveline 400 shown in FIG. 4 includes a power source 402, a drive circuit 404, an auxiliary circuit 406, a transmission 407, a first fluid accumulator 408, a second fluid accumulator 410, and a drive axle 412. Similar structural features of the hydrostatic driveline 100 are similarly referenced, with the exception of the below identified features.

The drive circuit 404 includes a variable displacement pump 417, a second fixed displacement pump 418, a variable displacement motor 419, a fixed displacement motor 420, a directional valve 422, and a plurality of drive fluid conduits 424. The variable displacement pump 417 and the second fixed displacement pump 418 cooperate to pump a variable amount of hydraulic fluid within a predetermined range through the drive circuit 404. The variable displacement motor 419 and the fixed displacement motor 420 cooperate to pump a variable amount of hydraulic fluid within a predetermined range through the drive circuit 404.

The second fixed displacement pump 418 of the drive circuit 404 may be a gear pump, a screw pump, a rotary vane pump, or any other type of fixed displacement pump. The second fixed displacement pump 418 is drivingly engaged with the power source 402 through a first drive shaft 414. A first fluid port 427 of the second fixed displacement pump 418 is in fluid communication with a first portion of the plurality of drive fluid conduits 424. A second fluid port 429 of the second fixed displacement pump 418 is in fluid communication with a second portion of the plurality of drive fluid conduits 424.

The fixed displacement motor 420 of the drive circuit 404 may be a gear motor, a screw motor, a rotary vane motor, or any other type of fixed displacement motor 420. The fixed displacement motor 420 is drivingly engaged with the drive axle 412 through a second drive shaft 430. A first fluid port 433 of the fixed displacement motor 420 is in fluid communication with a first portion of the plurality of drive fluid conduits 424. A second fluid port 435 of the fixed displacement motor 420 is in fluid communication with a second portion of the plurality of drive fluid conduits 424.

Figure 5:
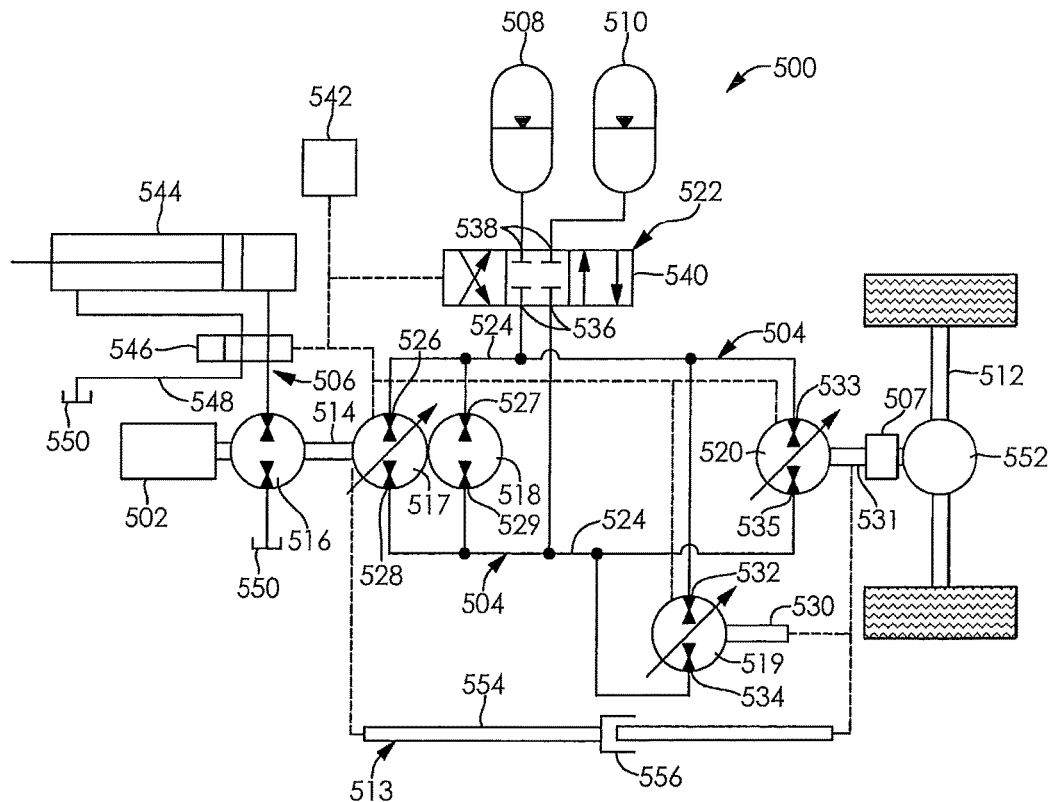
FIG. 5 is a schematic view of a hydrostatic driveline for a vehicle according to another embodiment of the present disclosure.

FIG. 5 shows a portion of an alternative embodiment of the hydrostatic driveline 100. A hydrostatic driveline 500 shown in FIG. 5 includes a power source 502, a drive circuit 504, an auxiliary circuit 506, a transmission 507, a first fluid accumulator 508, a second fluid accumulator 510, a drive axle 512, and a direct drive mechanism 513. Similar structural features of the hydrostatic driveline 100 are similarly referenced, with the exception of the below identified features.

The drive circuit 504 includes a variable displacement pump 517, a second fixed displacement pump 518, a first variable displacement motor 519, a second variable displacement motor 520, a directional valve 522, and a plurality of drive fluid conduits 524. The variable displacement pump 517 and the second fixed displacement pump 518 cooperate to pump a variable amount of hydraulic fluid within a predetermined range through the drive circuit 504. The first variable displacement motor 519 and the second variable displacement motor 520 cooperate to pump a variable amount of hydraulic fluid within a predetermined range through the drive circuit 504.

The second fixed displacement pump 518 of the drive circuit 504 may be a gear pump, a screw pump, a rotary vane pump, or any other type of fixed displacement pump. The second fixed displacement pump 518 is drivingly engaged with the power source 502 through a first drive shaft 514. A first fluid port 527 of the second fixed displacement pump 518 is in fluid communication with a first portion of the plurality of drive fluid conduits 524. A second fluid port 529 of the second fixed displacement pump 518 is in fluid communication with a second portion of the plurality of drive fluid conduits 524.

The first variable displacement motor 519 is a hydraulic axial piston motor having a movable swashplate. However, it is understood the first variable displacement motor 519 may be any other type of variable displacement motor. The first variable displacement motor 519 is drivingly engaged with the drive axle 512 through a second drive shaft 530. A first fluid port 532 of the first variable displacement motor 519 is in fluid communication with the first portion of the plurality of drive fluid conduits 524. A second fluid port 534 of the first variable displacement motor 519 is in fluid communication with the second portion of the plurality of drive fluid conduits 524.

The second variable displacement motor 520 is a hydraulic axial piston motor having a movable swashplate. However, it is understood the second variable displacement motor 520 may be any other type of variable displacement motor. The second variable displacement motor 520 is drivingly engaged with the drive axle 512 through a third drive shaft 531; however, it is understood that the first variable displacement motor 519 and the second variable displacement motor 520 may share a drive shaft. A first fluid port 533 of the second variable displacement motor 520 is in fluid communication with a first portion of the plurality of drive fluid conduits 524. A second fluid port 535 of the second variable displacement motor 520 is in fluid communication with a second portion of the plurality of drive fluid conduits 524.

The direct drive mechanism 513 includes at least one drive member 554 that permits selective and direct drive engagement between the first drive shaft 514 and the drive axle 512. As shown, a portion of the direct drive mechanism 513 is illustrated schematically; however, it is understood the direct drive mechanism 513 may include a plurality of gears, a plurality of rigid members, a plurality of kinematic joints, and at least one clutching device 556. As shown, the clutching device 556 is illustrated schematically; however, it is understood the clutching device 556 may be a dry or wet disk style clutch, a dog clutch, or any other type of clutch. A controller 542 in communication with the clutching device 556 is used to selectively engage the first drive shaft 514 with the drive axle 512.

Figure 6:
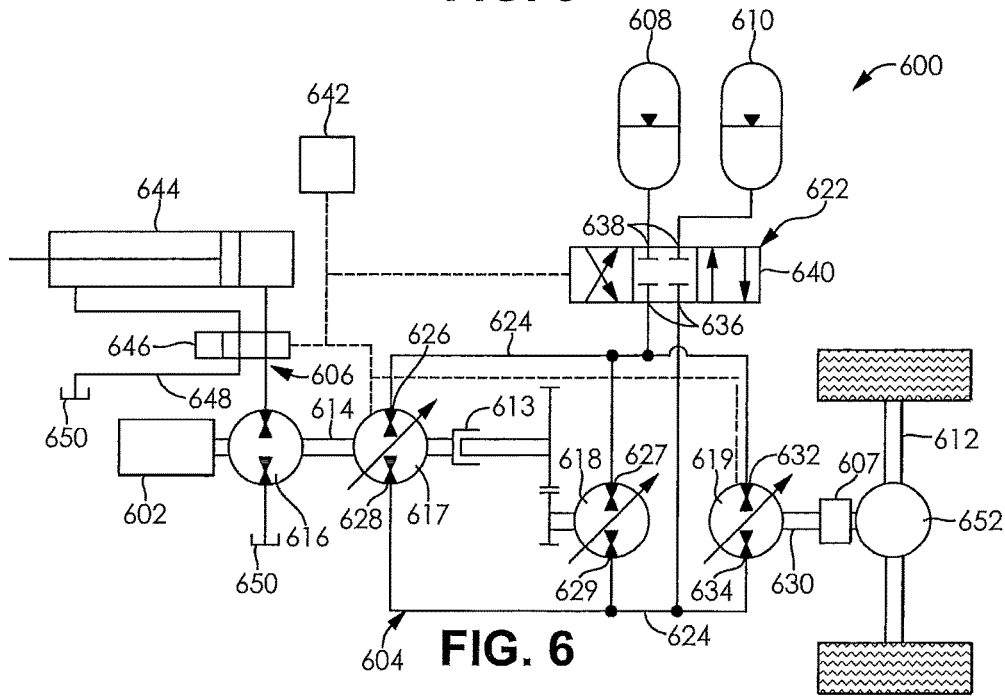
FIG. 6 is a schematic view of a hydrostatic driveline for a vehicle according to another embodiment of the present disclosure.

FIG. 6 shows a portion of an alternative embodiment of the hydrostatic driveline 100. A hydrostatic driveline 600 shown in FIG. 6 includes a power source 602, a drive circuit 604, an auxiliary circuit 606, a transmission 607, a first fluid accumulator 608, a second fluid accumulator 610, a drive axle 612, and an inter-pump clutching device 613. Similar structural features of the hydrostatic driveline 100 are similarly referenced, with the exception of the below identified features.

The drive circuit 604 includes a variable displacement pump 617, a second fixed displacement pump 618, a variable displacement motor 619, a directional valve 622, and a plurality of drive fluid conduits 624. The variable displacement pump 617 and the second fixed displacement pump 618 cooperate to pump a variable amount of hydraulic fluid within a predetermined range through the drive circuit 604.

The second fixed displacement pump 618 of the drive circuit 604 may be a gear pump, a screw pump, a rotary vane pump, or any other type of fixed displacement pump. The second fixed displacement pump 618 is drivingly engaged with the power source 602 through the first drive shaft 614 and the inter-pump clutching device 613. A first fluid port 627 of the second fixed displacement pump 618 is in fluid communication with a first portion of the plurality of drive fluid conduits 624. A second fluid port 629 of the second fixed displacement pump 618 is in fluid communication with a second portion of the plurality of drive fluid conduits 624.

The inter-pump clutching device 613 permits selective engagement of the second fixed displacement pump 618. As shown, the inter-pump clutching device 613 includes a clutch and a pair of gears; however, it is understood the inter-pump clutching device 613 may solely include a clutch. The clutch may be a dry or wet disk style clutch, a dog clutch, or any other type of clutch. The controller 642 in communication with the clutch is used to selectively engage the first drive shaft 614 with the second fixed displacement pump 618. The pair of gears may be used to modify a characteristic of a power transferred from the first drive shaft 614 to the second fixed displacement pump 618.

Figure 7:
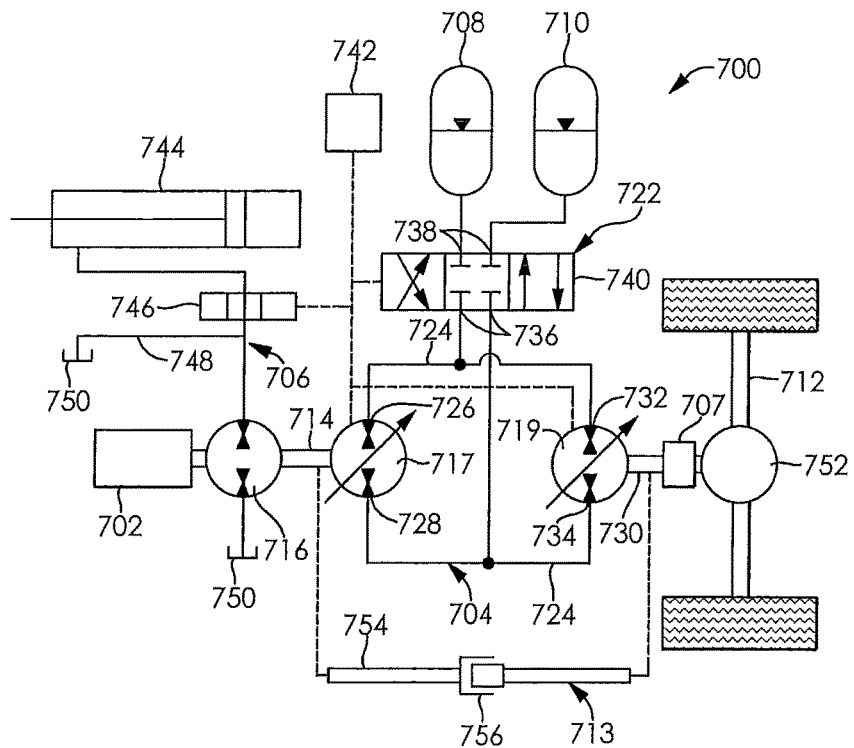
FIG. 7 is a schematic view of a hydrostatic driveline for a vehicle according to another embodiment of the present disclosure.

FIG. 7 shows a portion of an alternative embodiment of the hydrostatic driveline 100. A hydrostatic driveline 700 shown in FIG. 7 includes a power source 702, a drive circuit 704, an auxiliary circuit 706, a transmission 707, a first fluid accumulator 708, a second fluid accumulator 710, a drive axle 712, and a direct drive mechanism 713. Similar structural features of the hydrostatic driveline 100 are similarly referenced, with the exception of the below identified features.

The drive circuit includes a variable displacement pump 717, a variable displacement motor 719, a directional valve 722, and a plurality of drive fluid conduits 724. The variable displacement pump 717 and the variable displacement motor 719 cooperate to pump a variable amount of hydraulic fluid within a predetermined range through the drive circuit 704.

The direct drive mechanism 713 includes a plurality of members that permit selective and direct drive engagement between a first drive shaft 714 and the drive axle 712. The direct drive mechanism 713 includes a plurality of gears, at least one drive member 754, and at least one clutching device 756. The plurality of gears may be used to modify a characteristic of a power transferred from the first drive shaft 714 to the drive axle 712. As shown, the clutching device 756 is illustrated schematically; however, it is understood the clutching device may be a dry or wet disk style clutch, a dog clutch, or any other type of clutch. A controller 742 in communication with the clutching device 756 is used to selectively engage the first drive shaft 714 with the drive axle 712. Further, it is understood other embodiments of the direct drive mechanism 713 may be collinear with the first drive shaft 714 and a second drive shaft 730; such embodiments of the direct drive mechanism 713 comprising a clutch disposed between the first drive shaft 714 and the second drive shaft 730.

Figure 8:
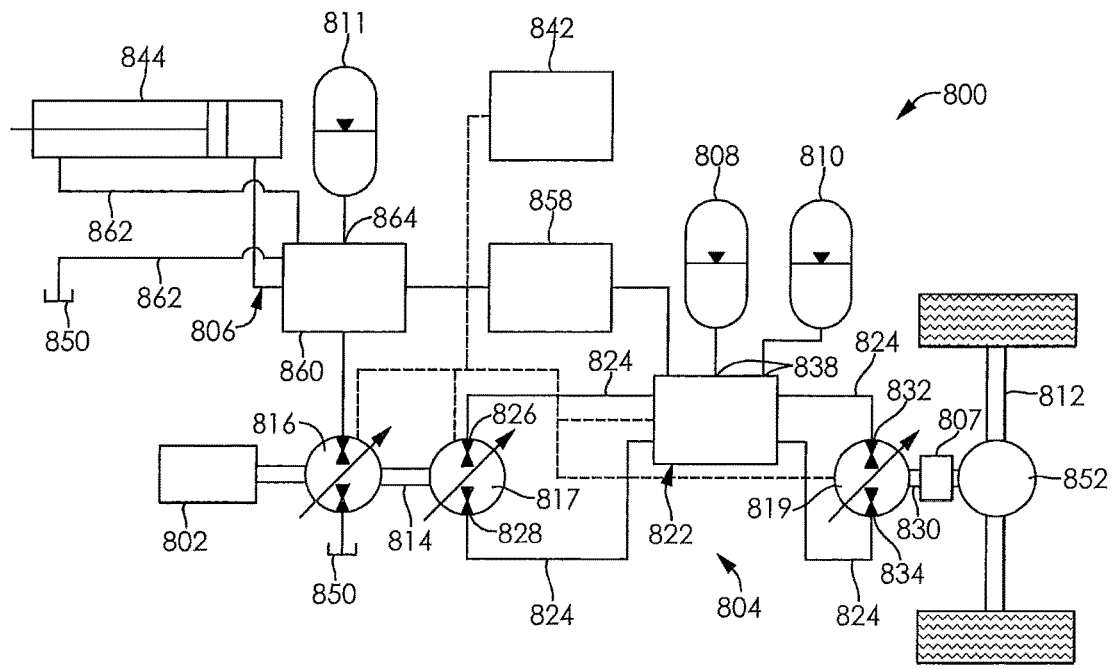
FIG. 8 is a schematic view of a hydrostatic driveline for a vehicle according to another embodiment of the present disclosure.

FIG. 8 shows a portion of an alternative embodiment of the hydrostatic driveline 100. A hydrostatic driveline 800 shown in FIG. 8 includes a power source 802, a drive circuit 804, an auxiliary circuit 806, a transmission 807, a first fluid accumulator 808, a second fluid accumulator 810, a third fluid accumulator 811, and a drive axle 812. The hydrostatic driveline shown in FIG. 8 may also include a direct drive mechanism (not shown) similar to the direct drive mechanism shown in FIG. 7. Similar structural features of the hydrostatic driveline 100 are similarly referenced, with the exception of the below identified features.

The drive circuit 804 includes a first variable displacement pump 816, a second variable displacement pump 817, a variable displacement motor 819, a directional valve 822, and a plurality of drive fluid conduits 824. The variable displacement pump 817 and the variable displacement motor 819 cooperate to drive the drive axle 812 with a variable amount of hydraulic fluid.

The auxiliary circuit 806 includes the variable displacement pump 816, a hydraulic transformer 858, an auxiliary directional valve 860, and a plurality of auxiliary fluid conduits 862. The variable displacement pump 816 and the hydraulic transformer 858 cooperate to drive an actuator 844 with a variable amount of hydraulic fluid.

The actuator 844 is a hydraulic cylinder; however, it is understood that the actuator may be a plurality of hydraulic cylinders, a hydraulic motor, or any other device powered by pressurized fluid. The actuator 844 is in fluid communication with the auxiliary directional valve 860. Typically, the actuator 844 engages a movable portion of the vehicle to facilitate the movement of a load. However, it is understood that the actuator 844 may be used in other ways.

The hydraulic transformer 858 is a fluid power device that permits energy to be transferred from the drive circuit 804 at a first pressure to the auxiliary circuit 806 at a second pressure, the first pressure different from the second pressure. Further, it is understood that the hydraulic transformer 858 may also permit energy to be transferred from the auxiliary circuit 806 to the drive circuit 804. The hydraulic transformer 858 is in fluid communication with the drive circuit 804, the auxiliary circuit 806, and at least one fluid reservoir 850.

The third fluid accumulator 811 is an accumulator as is known in the art. The third fluid accumulator 811 is a hollow vessel in fluid communication with an accumulator port 864 of the auxiliary directional valve 860. A quantity of gas within the third fluid accumulator 811 is compressed when hydraulic fluid enters the third fluid accumulator 811. The third fluid accumulator 811 may be configured for operation within a particular pressure range. While not shown, the third fluid accumulator 811 may also be fitted with a flush valve (for draining the third fluid accumulator 811 to the fluid reservoir 850), a pressure relief valve (for draining the third fluid accumulator 811 to the fluid reservoir 850), a proportional valve (for cooperating with the auxiliary directional valve 860 for fluidly connecting the third fluid accumulator 811 to the auxiliary circuit 806), and a pilot valve (for providing fluid pressure to the auxiliary directional valve 860). A controller 842 in communication with the flush valve, the proportional valve, and the pilot valve is used to change a position of the flush valve, the proportional valve, and the pilot valve.

It is within the spirit and the scope of the disclosure that any of the features described and illustrated in one of the aforementioned embodiments of the disclosure (FIGS. 1-8) may be applied to or combined with any of the features described and illustrated in any of the other aforementioned embodiments of the disclosure (FIGS. 1-8).

In use, the hydrostatic driveline 100, 200, 300, 400, 500, 600, 700, 800 according to the present disclosure offers many advantages over hydrostatic drivelines known in the art. The hydrostatic driveline 100, 200, 300, 400, 500, 600, 700, 800 according to the present disclosure incorporated into a vehicle increases efficiency of the vehicle, reduces a noise of the vehicle, enables a discontinuous release of stored energy, and affords precision control of the actuator 144, 244, 344, 444, 544, 644, 744, 844 and the drive axle 112, 212, 312, 412, 512, 612, 712, 812.

The hydrostatic driveline 100, 200, 300, 400, 500, 600, 700, 800 according to the present disclosure increases efficiency of the vehicle in several ways. The hydrostatic driveline 100, 200, 300, 400, 500, 600, 700, 800 permits the power source 102, 202, 302, 402, 502, 602, 702, 802 having a reduced output to be used in the vehicle, facilitates energy recuperation during vehicle braking, facilitates recuperation of potential energy during release of the actuator 144, 244, 344, 444, 544, 644, 744, 844, facilitates the release of stored energy to supplement the power source 102, 202, 302, 402, 502, 602, 702, 802 and permits stored energy to power secondary energy consuming devices of the vehicle.

The hydrostatic driveline 100, 200, 300, 400, 500, 600, 700, 800 permits a power source 102, 202, 302, 402, 502, 602, 702, 802 having a reduced output to be used in the vehicle by supplementing the capacity of the power source 102, 202, 302, 402, 502, 602, 702, 802 with energy stored in the accumulators 108, 110, 208, 210, 308, 310, 408, 410, 508, 510, 608, 610, 708, 710, 808, 810, 811 to meet a peak power demand of the vehicle. The peak power demand of the vehicle is typically limited to brief amounts of time, for example, during acceleration and load lifting of the vehicle. When supplementing the capacity of a power source is not an option, for instance, in the case of a traditional driveline including an internal combustion engine, the power source must be sized to accommodate the peak power demand of the vehicle. Typically, the power source sized for the traditional driveline exceeds an average power demand of the vehicle on the power source. By directing hydraulic fluid displaced by at least one of the fixed displacement pump 116, 216, 219, 316, 416, 418, 516, 518, 616, 618, 716 and the variable displacement pump 118, 218, 318, 417, 517, 617, 717, 816, 817 into at least one of the accumulators 108, 110, 208, 210, 308, 310, 408, 410, 508, 510, 608, 610, 708, 710, 808, 810, 811 when an instantaneous power demand of the vehicle is less than the average power demand of the vehicle (storing energy), such energy can later be released when the instantaneous power demand of the vehicle exceeds the average power demand of the vehicle. Such a direction of hydraulic fluid is determined by the controller 142, 242, 342, 442, 542, 642, 742, 842 in communication with at least one of the directional valve 122, 222, 322, 422, 522, 622, 722, 822, the auxiliary directional valve 860, the fixed displacement pump 116, 216, 219, 316, 319, 416, 418, 420, 516, 518, 616, 618, 716, the variable displacement pump 118, 120, 218, 220, 318, 320, 417, 419, 517, 519, 520, 617, 619, 717, 719, 816, 817, 819, and the hydraulic transformer 858. Accordingly, the power source 102, 202, 302, 402, 502, 602, 702, 802 having a reduced output to be incorporated into the vehicle without a reduction of the peak power demand available to the vehicle.

The hydrostatic driveline 100, 200, 300, 400, 500, 600, 700, 800 facilitates energy recuperation during vehicle braking by storing a kinetic energy of the vehicle and a kinetic energy of a load the vehicle may be carrying by directing hydraulic fluid displaced by at least one of the fixed displacement motor 319, 420 and the variable displacement motor 120, 220, 320, 419, 519, 520, 619, 719, 819 into at least one of the accumulators 108, 110, 208, 210, 308, 310, 408, 410, 508, 510, 608, 610, 708, 710, 808, 810. Further, such kinetic energy may be transferred into the auxiliary circuit 806 and stored in the third accumulator 811. Such a direction of hydraulic fluid and/or transfer of kinetic energy is determined by the controller 142, 242, 342, 442, 542, 642, 742, 842 in communication with at least one of the directional valve 122, 222, 322, 422, 522, 622, 722, 822, the auxiliary directional valve 860, the fixed displacement motor, the variable displacement motor 120, 220, 320, 419, 519, 520, 619, 719, 819, the fixed displacement pump 116, 216, 219, 316, 416, 418, 516, 518, 616, 618, 716, the variable displacement pump 118, 218, 318, 417, 517, 617, 717, 816, 817, and the hydraulic transformer 858.

The hydrostatic driveline 100, 200, 300, 400, 500, 600, 700, 800 facilitates recuperation of potential energy during release of the accumulator 108, 110, 208, 210, 308, 310, 408, 410, 508, 510, 608, 610, 708, 710, 808, 810 by directing hydraulic fluid displaced by a decrease of the potential energy into at least one of the accumulators 108, 110, 208, 210, 308, 310, 408, 410, 508, 510, 608, 610, 708, 710, 808, 810, 811. During vehicle operation, energy may be stored by the accumulator 108, 110, 208, 210, 308, 310, 408, 410, 508, 510, 608, 610, 708, 710, 808, 810 or a plurality of accumulators. As non-limiting examples, energy may be stored in a boom pivotally coupled to the vehicle, an extensible portion of the vehicle, and a load lifted by the vehicle. Such a direction of hydraulic fluid is determined by the controller 142, 242, 342, 442, 542, 642, 742, 842 in communication with at least one of the auxiliary directional valve 146, 246, 346, 446, 546, 646, 746, 846, the fixed displacement pump 116, 216, 219, 316, 416, 418, 516, 518, 616, 618, 716, the variable displacement pump 118, 218, 318, 417, 517, 617, 717, 816, 817, the fixed displacement motor 319, 420, the variable displacement motor 120, 220, 320, 419, 519, 520, 619, 719, 819, and the hydraulic transformer 858.

The hydrostatic driveline 100, 200, 300, 400, 500, 600, 700, 800 facilitates the release of stored energy to supplement the power source 102, 202, 302, 402, 502, 602, 702, 802 by directing hydraulic fluid stored in at least one of the accumulators 108, 110, 208, 210, 308, 310, 408, 410, 508, 510, 608, 610, 708, 710, 808, 810, 811 into at least one of the drive circuit 104, 204, 304, 404, 504, 604, 704, 804 and the auxiliary circuit 106, 206, 306, 406, 506, 606, 706, 806. The hydraulic fluid stored in at least one of the accumulators 108, 110, 208, 210, 308, 310, 408, 410, 508, 510, 608, 610, 708, 710, 808, 810, 811 is released when the instantaneous power demand of the vehicle exceeds the average power demand of the vehicle. Such a release of hydraulic fluid is determined by the controller 142, 242, 342, 442, 542, 642, 742, 842 in communication with at least one of the directional valve 146, 246, 346, 446, 546, 646, 746, 846, the auxiliary directional valve 146, 246, 346, 446, 546, 646, 746, 846, the fixed displacement pump 116, 216, 219, 316, 416, 418, 516, 518, 616, 618, 716, the variable displacement pump 118, 218, 318, 417, 517, 617, 717, 816, 817, the fixed displacement motor 319, 420, the variable displacement motor 120, 220, 320, 419, 519, 520, 619, 719, 819, and the hydraulic transformer 858. Further, it is understood that such a release of hydraulic fluid may be controlled by an operator of the vehicle as desired by the operator of vehicle.

The hydrostatic driveline 100, 200, 300, 400, 500, 600, 700, 800 permits stored energy to power secondary energy consuming devices of the vehicle by directing hydraulic fluid stored in the accumulators 108, 110, 208, 210, 308, 310, 408, 410, 508, 510, 608, 610, 708, 710, 808, 810, 811 into at least one of the drive circuit 104, 204, 304, 404, 504, 604, 704, 804 and the auxiliary circuit 106, 206, 306, 406, 506, 606, 706, 806. As non-limiting examples, the secondary energy consuming devices may be a light, an air conditioner, a radio, a vehicle starter, or any other consuming device that requires an amount of energy small in proportion to a capacity of the hydrostatic driveline 100, 200, 300, 400, 500, 600, 700, 800. A generator (not shown) drivingly engaged with one of the fixed displacement pump 116, 216, 219, 316, 416, 418, 516, 518, 616, 618, 716, the variable displacement pump 118, 218, 318, 417, 517, 617, 717, 816, 817, the fixed displacement motor 319, 420, the variable displacement motor 120, 220, 320, 419, 519, 520, 619, 719, 819, the hydraulic transformer 858, the first drive shaft 114, 214, 314, 414, 514, 614, 714, 814, the second drive shaft 130, 230, 330, 430, 530, 630, 730, 830, and the direct drive mechanism 513, 713 is in communication with an electrical circuit (not shown) to power the secondary energy consuming devices. When the secondary energy consuming device is the vehicle starter, it is understood that the vehicle starter may include the accumulators 108, 110, 208, 210, 308, 310, 408, 410, 508, 510, 608, 610, 708, 710, 808, 810, 811 and one of the fixed displacement pump 116, 216, 219, 316, 416, 418, 516, 518, 616, 618, 716 and the variable displacement pump 118, 218, 318, 417, 517, 617, 717, 816, 817, wherein one of the fixed displacement pump 116, 216, 219, 316, 416, 418, 516, 518, 616, 618, 716 and the variable displacement pump 118, 218, 318, 417, 517, 617, 717, 816, 817 drivingly engages the power source 102, 202, 302, 402, 502, 602, 702, 802 to start the power source 102, 202, 302, 402, 502, 602, 702, 802. Such a release of hydraulic fluid is determined by the controller 142, 242, 342, 442, 542, 642, 742, 842 in communication with at least one of the directional valve 146, 246, 346, 446, 546, 646, 746, 846, the auxiliary directional valve 146, 246, 346, 446, 546, 646, 746, 846, the fixed displacement pump 116, 216, 219, 316, 416, 418, 516, 518, 616, 618, 716, the variable displacement pump 118,

218, 318, 417, 517, 617, 717, 816, 817, the fixed displacement motor 319, 420, the variable displacement motor 120, 220, 320, 419, 519, 520, 619, 719, 819, and the hydraulic transformer 858.

The hydrostatic driveline 100, 200, 300, 400, 500, 600, 700, 800 according to the present disclosure reduces a noise of the vehicle. The power source 102, 202, 302, 402, 502, 602, 702, 802 sized for the traditional driveline operates at a fluctuating speed to match an instantaneous power demand of the vehicle. By incorporating a power source 102, 202, 302, 402, 502, 602, 702, 802 of smaller capacity into the vehicle and storing energy in at least one of the accumulators 108, 110, 208, 210, 308, 310, 408, 410, 508, 510, 608, 610, 708, 710, 808, 810, 811 for release when the instantaneous power demand of the vehicle exceeds the average power demand of the vehicle, the power source 102, 202, 302, 402, 502, 602, 702, 802 can operate at a near constant speed that generates an amount of power equal to about the average power demand of the vehicle. The power source 102, 202, 302, 402, 502, 602, 702, 802 operating at the near constant speed that generates the amount of power equal to about the average power demand of the vehicle does not generate as much noise as the power source 102, 202, 302, 402, 502, 602, 702, 802 sized for the traditional driveline operating at a fluctuating speed. Further, it is understood that the operator of the vehicle may direct the release of hydraulic fluid from the accumulators 108, 110, 208, 210, 308, 310, 408, 410, 508, 510, 608, 610, 708, 710, 808, 810, 811 to supplement the power source 102, 202, 302, 402, 502, 602, 702, 802, permitting the power source 102, 202, 302, 402, 502, 602, 702, 802 to operate at a near constant speed when the power demand of the vehicle exceeds the average power demand of the vehicle. Also, it is understood that the hydrostatic driveline 100, 200, 300, 400, 500, 600, 700, 800 according to the present disclosure may also be used with the power source 102, 202, 302, 402, 502, 602, 702, 802 sized for the traditional driveline, and the release of hydraulic fluid from the accumulators 108, 110, 208, 210, 308, 310, 408, 410, 508, 510, 608, 610, 708, 710, 808, 810, 811 to supplement the power source 102, 202, 302, 402, 502, 602, 702, 802 enables the power source 102, 202, 302, 402, 502, 602, 702, 802 to not generate as much noise as the power source 102, 202, 302, 402, 502, 602, 702, 802 used with the traditional driveline.

The hydrostatic driveline 100, 200, 300, 400, 500, 600, 700, 800 according to the present disclosure enables a discontinuous release of stored energy by directing hydraulic fluid stored in the accumulators 108, 110, 208, 210, 308, 310, 408, 410, 508, 510, 608, 610, 708, 710, 808, 810, 811 into the drive circuit 104, 204, 304, 404, 504, 604, 704, 804 or the auxiliary circuit 106, 206, 306, 406, 506, 606, 706, 806. The discontinuous release of stored energy into the drive circuit 104, 204, 304, 404, 504, 604, 704, 804 or the auxiliary circuit 106, 206, 306, 406, 506, 606, 706, 806 is controlled by the operator of the vehicle and may be known as "hammer" mode. "Hammer" mode enables the vehicle to perform a plurality of successive brief accelerations in a relatively short amount of time. Such successive brief accelerations may be directed to the drive axle 112, 212, 312, 412, 512, 612, 712, 812 or to the actuator 144, 244, 344, 444, 544, 644, 744, 844. Further, "hammer" mode as contemplated by the hydrostatic driveline 100, 200, 300, 400, 500, 600, 700, 800 according to the present disclosure may be performed as a series of controlled low frequency waves to militate against driver discomfort that may result from a discontinuous release of stored energy. As a non-limiting example, "hammer" mode is particularly useful when the vehicle includes an articulated bucket, enabling the articulated bucket to collect a greater amount of an aggregate material by increasing a distance over which the vehicle is decelerated upon making contact with the aggregate material. As further non-limiting examples, "hammer" mode may also be used to dislodge jammed objects, compact materials such as dirt or stone, or compacting frozen precipitates. Such a release of hydraulic fluid is directed by the operator of the vehicle and determined by the controller in communication with at least one of the directional valve 146, 246, 346, 446, 546, 646, 746, 846, the auxiliary directional valve 146, 246, 346, 446, 546, 646, 746, 846, the fixed displacement pump 116, 216, 219, 316, 416, 418, 516, 518, 616, 618, 716, the variable displacement pump 118, 218, 318, 417, 517, 617, 717, 816, 817, the fixed displacement motor 319, 420, the variable displacement motor 120, 220, 320, 419, 519, 520, 619, 719, 819, and the hydraulic transformer 858.

The hydrostatic driveline 100, 200, 300, 400, 500, 600, 700, 800 according to the present disclosure affords precision control of the actuator 144, 244, 344, 444, 544, 644, 744, 844. The hydrostatic driveline 100, 200, 300, 400, 500, 600, 700, 800 militates against stiction and hysteresis of the actuator 144, 244, 344, 444, 544, 644, 744, 844.

The hydrostatic driveline 100, 200, 300, 400, 500, 600, 700, 800 according to the present disclosure enables a discontinuous release of stored energy from the accumulators 108, 110, 208, 210, 308, 310, 408, 410, 508, 510, 608, 610, 708, 710, 808, 810, 811 into the auxiliary circuit 106, 206, 306, 406, 506, 606, 706, 806 to militate against stiction and hysteresis of the actuator 144, 244, 344, 444, 544, 644, 744, 844. The discontinuous release of stored energy into the auxiliary circuit 106, 206, 306, 406, 506, 606, 706, 806 is controlled automatically and may be known as "dither" mode. "Dither" mode release small amounts of hydraulic fluid from the accumulators 108, 110, 208, 210, 308, 310, 408, 410, 508, 510, 608, 610, 708, 710, 808, 810, 811 to the auxiliary circuit 106, 206, 306, 406, 506, 606, 706, 806 to minimally fluctuate a position of the actuators 144, 244, 344, 444, 544, 644, 744, 844 to militate against stiction and hysteresis. Such a release of hydraulic fluid is determined by the controller 142, 242, 342, 442, 542, 642, 742, 842 in communication with at least one of the directional valve 146, 246, 346, 446, 546, 646, 746, 846, the auxiliary directional valve 146, 246, 346, 446, 546, 646, 746, 846, the fixed displacement pump 116, 216, 219, 316, 416, 418, 516, 518, 616, 618, 716, the variable displacement pump 118, 218, 318, 417, 517, 617, 717, 816, 817, the fixed displacement motor 319, 420, the variable displacement motor 120, 220, 320, 419, 519, 520, 619, 719, 819, and the hydraulic transformer 858. By militating against stiction and hysteresis of the actuator 144, 244, 344, 444, 544, 644, 744, 844, precision control of the actuator 144, 244, 344, 444, 544, 644, 744, 844 is provided to the hydrostatic driveline 100, 200, 300, 400, 500, 600, 700, 800.

The controller 142, 242, 342, 442, 542, 642, 742, 842 of the hydrostatic driveline 100, 200, 300, 400, 500, 600, 700, 800 performs and controls many tasks that result in an increase of the efficiency of the vehicle the hydrostatic driveline 100, 200, 300, 400, 500, 600, 700, 800 is incorporated in. The controller 142, 242, 342, 442, 542, 642, 742, 842 is configured according to a method for optimizing the parameters of the hydrostatic driveline 100, 200, 300, 400, 500, 600, 700, 800, a method for determining an optimal state of charge control function for the accumulators 108, 110, 208, 210, 308, 310, 408, 410, 508, 510, 608, 610, 708, 710, 808, 810, 811, and a method for tracking an optimal state of charge of the accumulators 108, 110, 208, 210, 308, 310, 408, 410, 508, 510, 608, 610, 708, 710, 808, 810, 811.

Figure 9:
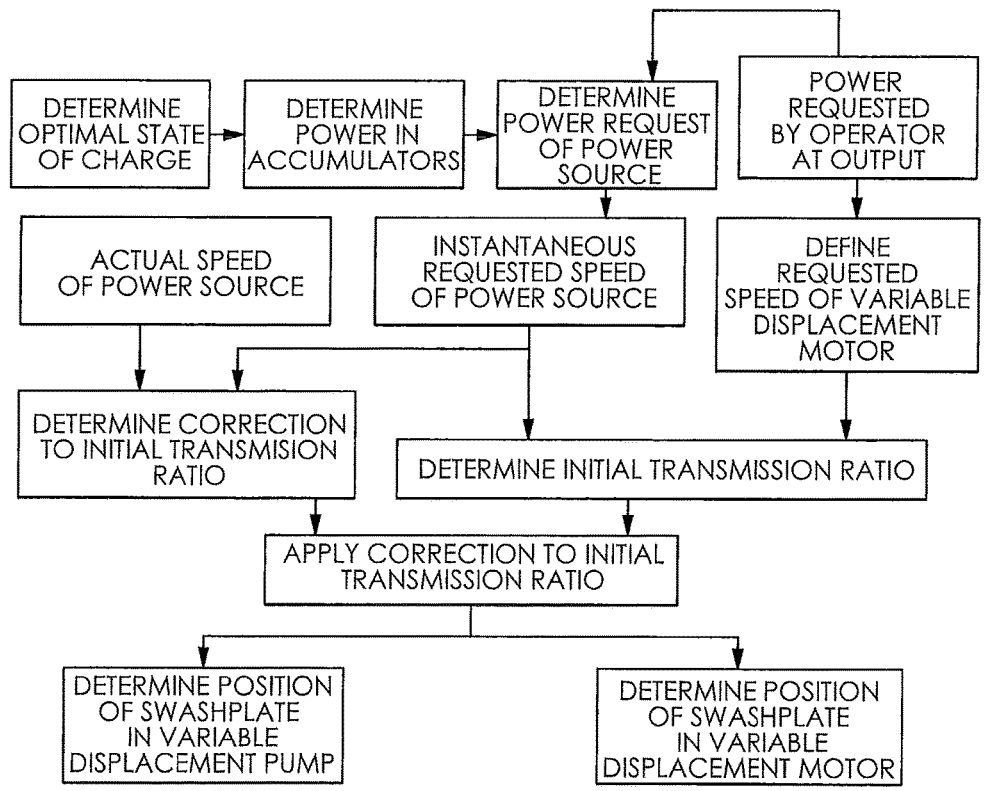
FIG. 9 is a diagram illustrating the process of determining the position of a swashplate for a variable displacement pump.

To optimize the parameters of the hydrostatic driveline 100, 200, 300, 400, 500, 600, 700, 800, a specific fuel consumption of the vehicle must be minimized with respect to an amount of power provided by the power source 102, 202, 302, 402, 502, 602, 702, 802. The amount of power provided by the power source 102, 202, 302, 402, 502, 602, 702, 802 to the hydrostatic driveline 100, 200, 300, 400, 500, 600, 700, 800 is determined based on an a power request at the output by the operator of the vehicle. FIG. 9 illustrates the process of determining the amount of power provided by the power source 102, 202, 302, 402, 502, 602, 702, 802. The power request at the output is based on a position of a throttle of the vehicle as desired by the operator, and includes power directed to the drive axle 112, 212, 312, 412, 512, 612, 712, 812 and power directed to the auxiliary circuit 106, 206, 306, 406, 506, 606, 706, 806.

A power request of the power source 102, 202, 302, 402, 502, 602, 702, 802 is determined by reducing the power request at the output by the amount of power the accumulators 108, 110, 208, 210, 308, 310, 408, 410, 508, 510, 608, 610, 708, 710, 808, 810, 811 are capable of supplying. As shown in FIG. 9, the optimal state of charge is determined, which is used to determine the amount of power the accumulators 108, 110, 208, 210, 308, 310, 408, 410, 508, 510, 608, 610, 708, 710, 808, 810, 811 are capable of supplying. The optimal state of charge is determined based on the speed of the vehicle and the amount of energy which may be stored in one of the boom pivotally coupled to the vehicle, the extensible portion of the vehicle, and the load lifted by the vehicle. The amount of power the accumulators 108, 110, 208, 210, 308, 310, 408, 410, 508, 510, 608, 610, 708, 710, 808, 810, 811 are capable of supplying is determined using at least the state of charge of the accumulators 108, 110, 208, 210, 308, 310, 408, 410, 508, 510, 608, 610, 708, 710, 808, 810, 811. Further, it is understood that the amount of power the accumulators 108, 110, 208, 210, 308, 310, 408, 410, 508, 510, 608, 610, 708, 710, 808, 810, 811 are capable of supplying may also be determined using the state of charge and a lookup table or calculated by the controller 142, 242, 342, 442, 542, 642, 742, 842 using a function.

The power request of the power source 102, 202, 302, 402, 502, 602, 702, 802 is met by adjusting an operating speed of the power source 102, 202, 302, 402, 502, 602, 702, 802, taking into account the efficiencies of the variable displacement pump 118, 318, 717, 817 (or the combination of the fixed displacement pump 219, 418, 518, 618 and the variable displacement pump 218, 417, 517, 617) and the variable displacement motor 120, 220, 519, 520, 619, 719, 819 (or the combination of the fixed displacement motor 319, 420 and the variable displacement motor 320, 419).

The specific fuel consumption of a vehicle having the hydrostatic driveline 100, 200, 300, 400, 500, 600, 700, 800 with the variable displacement pump 118, 318, 717, 817 (or the combination of the fixed displacement pump 219, 418, 518, 618 and the variable displacement pump 218, 417, 517, 617) and the variable displacement motor 120, 220, 519, 520, 619, 719, 819 (or the combination of the fixed displacement motor 319, 420 and the variable displacement motor 320, 419) is equal to an amount of fuel consumed per a power output of the vehicle. Further, the power output of the vehicle is equal to a power output of the power source 102, 202, 302, 402, 502, 602, 702, 802 of the vehicle multiplied by an efficiency of the variable displacement motor 120, 220, 519, 520, 619, 719, 819 (or the combination of the fixed displacement motor 319, 420 and the variable displacement motor 320, 419) and an efficiency of the variable displacement pump 118, 318, 717, 817 (or the combination of the fixed displacement pump 219, 418, 518, 618 and the variable displacement pump 218, 417, 517, 617) used in the drive circuit 104, 204, 304, 404, 505, 604, 704, 804 and the auxiliary circuit 106, 206, 306, 406, 506, 606, 706, 806. It is also understood that other efficiencies of the hydrostatic driveline 100, 200, 300, 400, 500, 600, 700, 800 such as mechanical losses and hydraulic losses are considered in determining the power output of the vehicle.

The mechanical and volumetric efficiency of the variable displacement motor 120, 220, 320, 419, 519, 520, 619, 719, 819 is a function of at least a speed, a displacement, and an operating pressure of the variable displacement motor 120, 220, 320, 419, 519, 520, 619, 719, 819. The efficiency of the variable displacement motor 120, 220, 320, 419, 519, 520, 619, 719, 819 can be expressed using an efficiency map that is a function of at least a speed, a displacement, and an operating pressure of the variable displacement motor 120, 220, 320, 419, 519, 520, 619, 719, 819. The efficiency map can be empirically determined using test data.

To determine the efficiency map of a variable displacement motor 120, 220, 320, 419, 519, 520, 619, 719, 819, a controllable input source is provided on the first fluid port 132, 227, 327, 427, 433, 527, 532, 627, the second fluid port 134, 229, 329, 429, 435, 529, 534, 629 and a variable load is provided on a mechanical power output 130, 230, 330, 430, 530, 630, 730, 830. By measuring the hydraulic power input and the mechanical power output of the variable displacement motor 120, 220, 320, 419, 519, 520, 619, 719, 819, while varying the operating conditions over a range of possible values of the aforementioned variables, the efficiency can be calculated and stored in an efficiency map.

The mechanical and volumetric efficiency of the variable displacement pump 118, 218, 318, 417, 517, 617, 717, 816, 817 is a function of at least a speed, a displacement, and an operating pressure of the variable displacement pump 118, 218, 318, 417, 517, 617, 717, 816, 817. The efficiency of the variable displacement pump 118, 218, 318, 417, 517, 617, 717, 816, 817 is expressed by an efficiency map that is a function of at least a speed, a displacement, and an operating pressure of the variable displacement pump 118, 218, 318, 417, 517, 617, 717, 816, 817. The efficiency map can be empirically determined using test data.

To determine the efficiency map of a variable displacement pump 118, 218, 318, 417, 517, 617, 717, 816, 817, a controllable input source is provided on the mechanical shaft of the variable displacement pump 118, 218, 318, 417, 517, 617, 717, 816, 817 and a variable load is provided on the hydraulic power output 124, 224, 324, 424, 524 624, 724, 824. By measuring the mechanical power input and the hydraulic power output of the variable displacement pump 118, 218, 318, 417, 517, 617, 717, 816, 817, while varying the operating conditions of the variable displacement pump 118, 218, 318, 417, 517, 617, 717, 816, 817 over a range of values for the aforementioned variables, the efficiency can be calculated and stored in an efficiency map The efficiency maps of the variable displacement pump 118, 218, 318, 417, 517, 617, 717, 816, 817 and the variable displacement motor 120, 220, 320, 419, 519, 520, 619, 719, 819 can be stored in the controller 142, 242, 342, 442, 542, 642, 742, 842.

Once the amount of power to be requested to be provided by the power source 102, 202, 302, 402, 502, 602, 702, 802 is determined, a position of a swashplate in the variable displacement pump 118, 218, 318, 417, 517, 617, 717, 816, 817 and the variable displacement motor 120, 220, 320, 419, 519, 520, 619, 719, 819 is determined. FIG. 9 illustrates the process of determining the position of a swashplate in the variable displacement pump 118, 218, 318, 417, 517, 617, 717, 816, 817 and the variable displacement motor 120, 220, 320, 419, 519, 520, 619, 719, 819.

By comparing an instantaneous requested speed of the power source 102, 202, 302, 402, 502, 602, 702, 802 to an instantaneous requested speed of the variable displacement motor 120, 220, 519, 520, 619, 719, 819 (or the combination of the fixed displacement motor 319, 420 and the variable displacement motor 320, 419), an initial transmission ratio is determined. Moreover, by comparing a requested speed of the power source 102, 202, 302, 402, 502, 602, 702, 802 (based on a prior adjustment or the average power demand) to an actual speed of the power source 102, 202, 302, 402, 502, 602, 702, 802 a correction to the initial transmission ratio is calculated. The controller 142, 242, 342, 442, 542, 642, 742, 842 determines whether the initial transmission ratio should be increased or decreased base on an amount of error between the instantaneous requested speed of the power source 102, 202, 302, 402, 502, 602, 702, 802 and the actual speed of the power source 102, 202, 302, 402, 502, 602, 702, 802. By comparing the initial transmission ratio to the desired transmission ratio, the controller 142, 242, 342, 442, 542, 642, 742, 842 determines whether the initial transmission ratio should be increased or decreased.

Next, by comparing an instantaneous speed of the power source 102, 202, 302, 402, 502, 602, 702, 802 to the requested speed of the power source 102, 202, 302, 402, 502, 602, 702, 802, the controller 142, 242, 342, 442, 542, 642, 742, 842 determines whether the speed of the power source 102, 202, 302, 402, 502, 602, 702, 802 should be increased or decreased.

Finally, the controller 142, 242, 342, 442, 542, 642, 742, 842 determines the position of the swashplate in the variable displacement pump 118, 218, 318, 417, 517, 617, 717, 816, 817 and the variable displacement motor 120, 220, 320, 419, 519, 520, 619, 719, 819. The position of the swashplate in the variable displacement pump 118, 218, 318, 417, 517, 617, 717, 816, 817 and the variable displacement motor 120, 220, 320, 419, 519, 520, 619, 719, 819 is dependent on whether the initial transmission ratio should be increased or decreased and whether speed of the power source 102, 202, 302, 402, 502, 602, 702, 802 should be increased or decreased.

To determine the optimal state of charge control function for the hydrostatic driveline 100, 200, 300, 400, 500, 600, 700, 800, the controller 142, 242, 342, 442, 542, 642, 742, 842 can compare a plurality of inputs based on vehicle observation and driver behavior to a plurality of conditions for optimized operation of the hydrostatic driveline 100, 200, 300, 400, 500, 600, 700, 800.

The plurality of conditions for optimized operation of the hydrostatic driveline 100, 200, 300, 400, 500, 600, 700, 800 include the condition that the accumulators 108, 110, 208, 210, 308, 310, 408, 410, 508, 510, 608, 610, 708, 710, 808, 810, 811 should be filled whenever the vehicle comes to a stop, the condition that potential energy lost during release of the actuators 144, 244, 344, 444, 544, 644, 744, 844 should be recuperated by directing hydraulic fluid displaced by a decrease of the potential energy into at least one of the accumulators 108, 110, 208, 210, 308, 310, 408, 410, 508, 510, 608, 610, 708, 710, 808, 810, 811, and the condition that as much energy as possible should be stored in the accumulators 108, 110, 208, 210, 308, 310, 408, 410, 508, 510, 608, 610, 708, 710, 808, 810, 811 during a braking process of the vehicle. It is understood the plurality of conditions for optimized operation of the hydrostatic driveline 100, 200, 300, 400, 500, 600, 700, 800 may include other conditions.

The plurality of inputs based on vehicle observation are also used to determine the optimal state of charge control function. The plurality of inputs includes a speed of the vehicle, a rate of fluid depletion from the accumulators 108, 110, 208, 210, 308, 310, 408, 410, 508, 510, 608, 610, 708, 710, 808, 810, 811, a load height, a torque demand of the vehicle, and a power demand of the vehicle. It is understood the plurality of inputs based on vehicle observation may include other parameters.

The plurality of inputs based on driver behavior are also used to determine the optimal state of charge control function. The plurality of inputs includes a position of the throttle of the vehicle, a position of a brake of the vehicle, a frequency of acceleration of the vehicle, a frequency of braking of the vehicle, an intensity of acceleration of the vehicle, and an intensity of braking of the vehicle. It is understood the plurality of inputs based on driver behavior may include other parameters.

In one embodiment, the optimal state of charge control function is determined based on vehicle measurements, driver behavior and a set of boundary conditions for optimized operation of the hydrostatic driveline 100, 200, 300, 400, 500, 600, 700, 800. These boundary conditions include that the condition that the accumulators 108, 110, 208, 210, 308, 310, 408, 410, 508, 510, 608, 610, 708, 710, 808, 810, 811 should be filled whenever the vehicle comes to a stop and energy recuperation during vehicle braking. The optimal state of charge control function is influenced by various parameters and conditions. If a vehicle is used mostly in low vehicle speed situations, the optimal state of charge control function may be lower at higher vehicle speeds.

The optimal state of charge control function can be determined online or offline. The optimal state of charge control function can be determined by several methods including using a look-up table, using adaptive control based on changes in state of charge during a duty cycle, and using upper and lower limits of the available and required energy of a system.

To limit the online computational requirements required to determine the optimal state of charge control function in real time, an optimal state of charge function look-up table can be generated. To determine the optimal state of charge control function using a look-up table the controller 142, 242, 342, 442, 542, 642, 742, 842 identifies the vehicle environment and driver behavior based on a plurality of inputs and using a predetermined optimal state of control function table.

The optimal state of charge control function look-up table is generated offline using a range of data collected from a vehicle during typical operational cycles and driver behavior. This data is processed offline and an optimal state of charge control function is determine for each operational cycles and driver behavior. Key features of each combination of operational cycle and driver behavior are identified and calculated and a look-up table is created corresponding the key features to optimal state of charge control functions.

To measure a wide variety of typical operational cycles and driver behavior data a duty cycle is performed. A duty cycle is a typical vehicle maneuver which is repeated often for the particular vehicle type. For off-highway vehicles such as, but not limited to, fork lifts, teleboom handlers, front-end loaders, back-hoe loaders, load-haul dumpers, reach stackers and agriculture tractors, a limited set number of maneuvers are repeated often during operation of the vehicle. For example, for a fork lift a Y-cycle is a typical duty cycle which is repeated often. The Y-cycle can include the steps of picking up a load at an initial starting point, driving backwards and sideways, driving forwards and sideways, dropping off the load, driving backwards and sideways, driving forwards and sideways, and reaching the initial starting point. Duty cycles are repeated often, it can be assumed that if the vehicle operator can recognize the executed duty cycle while the vehicle is still executing the duty cycle, the vehicle operator can anticipate the optimal state of charge control function. Each duty cycle can also be repeated with a variety of driving behaviors, such as aggressive driving and non-aggressive driving.

The data is then processed and an optimal state of charge function for each duty cycle and driver behavior is generated using an optimization algorithm which processes the duty cycle data and minimizes a cost function of energy usage of the duty cycle. In particular, factors such as, but not limited to, vehicle acceleration and deceleration over the duty cycle and the depletion and filling of the accumulators 108, 110, 208, 210, 308, 310, 408, 410, 508, 510, 608, 610, 708, 710, 808, 810, 811 are simulated and accounted for. The algorithm iteratively processes the duty cycle data to minimize the energy consumption cost function to obtain an optimal state of charge control function which matches the set of boundary conditions. Methods including, but not limited to, dynamic programming algorithms can be used to obtain the optimal state of charge control function such as those described in Wang, et al., "Application Study on the Dynamic Programming Algorithm for Energy Management of Plug-in Hybrid Electric Vehicles" *Energies,* 8, 3225-3244 (2015) and O'Keefe, et al, Dynamic Programming Applied to Investigate Energy Management Strategies for a Plug-in HEV presented at the Presented at the 22nd International Battery, Hybrid and Fuel Cell Electric Vehicle Symposium and Exhibition (EVS-22) Yokohama, Japan Oct. 23-28, 2006.

Next, key features of each combination of duty cycle and driver behavior are identified. These key features include, but are not limited to, maximum acceleration, mean acceleration, maximum deceleration, number of accelerations, number of vehicle reversals (change in driving direction), maximum speed, etc. By identifying the key features, each duty cycle and driver behavior combination can be characterized by only a limited amount of variables.

For each duty cycle and driver behavior a set of key features and the optimal state of charge control function has been calculated, these combinations are stored in a look-up table resulting in one optimal state of charge function representing each combination of values for the key features. The look-up table correlating the key features and optimal state of charge control functions is stored in the controller 142, 242, 342, 442, 542, 642, 742, 842. Since the duty cycles are represented by key features, the memory usage required by the controller 142, 242, 342, 442, 542, 642, 742, 842 is limited.

The optimal state of charge control function of the vehicle during operation can be determined online using the look-up tables stored in the controller 142, 242, 342, 442, 542, 642, 742, 842. The key features used to create the look-up table are measured online during vehicle operation. The key features are calculated using data measured directly from the vehicle over a window of operation which be a set period of time or a set speed. For example, the key features can be calculated during a set period of time lapse of vehicle operation, for example, but not limited to, 15 seconds. The key features calculated during the window of operation are used to determine the optimal state of charge control function from the look-up table.

To determine the optimal state of charge function from the look-up table, the measured key features can be rounded to the nearest key features in the look-up table, or interpolation in between two known optimal state of charge control functions is performed. The optimal state of charge control function determined corresponds to a current vehicle duty cycle and driver behavior. This optimal state of charge control function can for example be state of charge in function of time or vehicle speed.

When interpolating the optimal state of charge control function for a set of measured key features, the two nearest key feature sets on the look-up table are used and an state of charge curve based on the measured key featured can be generated. The state of charge curves can be based on various key features, for example, as shown in FIG. 12, the state of charge curve is function of vehicle speed. The calculated set of key features is represented on the third axis with FV (feature variable). Although the key features in FIG. 12 are represented on a single axis, key features can be a combination of variables can represented on multiple dimensions. The state of charge curves for a set of key features from the look-up table closest to the calculated set of key features are represented by $FV_a$ and $FV_b$. These two state of charge curves are interpolated to obtain the resulting optimal state of charge control function.

In another embodiment, the optimal state of charge control function is determined based on a known change in state of charge at the beginning and ending of a operational cycle. When executing an operational cycle, the state of charge at the beginning and the end of the duty cycle is the same for each iteration of the cycle. The operational cycle can be a duty cycle. Therefore, adaptive control can be applied to determine the optimal state of charge control function. To do so an initial state of charge control function is imposed using a curve based on two known end points for a key feature i.e. the state of charge at zero speed should be 100% and the state of charge at maximum speed should be 0%. Between these two points, a curve is imposed which can be e.g. a spline, a B-spline or a quadratic function. This curve is then adaptable through a limited number of degrees of freedom (DOF), e.g. the derivative at zero and at maximum speed (two DOF).

A duty cycle is executed and the state of charge at the beginning and at the end of the cycle is stored in the controller 142, 242, 342, 442, 542, 642, 742, 842, FIG. 14. The state of charge difference (ΔSOC) between the beginning and the end of the cycle is calculated. If the ΔSOC is negative, i.e., the state of charge is lower at the end of the duty cycle and, thus, too much hydraulic energy was consumed, the curve is increased such that the state of charge is higher at the end of the duty cycle execution by moving the curve's derivatives at zero and maximum speed in an iterative process until the ΔSOC is zero as depicted in FIG. 13. The adaptation of the limited number of DOF of the state of charge control function based on ΔSOC after a duty cycle can be performed using a learning control, such as, but not limited, a Kalman filter employing a confidence level. After each duty cycle execution, the ΔSOC is inputted to the learning control which adapts the limited number of DOF. The learning control adapts these DOF in relation to the confidence level and size of ΔSOC.

In another embodiment, the optimal state of charge control function can also be determined based on the available and required energy on the vehicle. For example, a typical off-highway vehicle wherein there are auxiliary attachments can make use of the hydraulic energy stored in the accumulators 108, 110, 208, 210, 308, 310, 408, 410, 508, 510, 608, 610, 708, 710, 808, 810, 811. These auxiliary attachments can also be used to recuperate energy, for example, but not limited to, the boom of a teleboom handler, the bucket of a front-end loader or the shovel of a back-hoe loader. The instantaneous available or required energy on the vehicle is related to the vehicle speed (kinetic energy) and potentially recoverable or required hydraulic energy (potential energy). For example, for a front end loader, when the vehicle is at a standstill with the bucket in the lowest position and no load, the state of charge should be sufficient for the combined event wherein the vehicle lifts a maximum load and accelerates to top speed. In addition, when the vehicle's hydraulics is fully loaded and it is cruising at top speed, the depletion amount of the state of charge should be enough for storing the recuperated energy during a braking event and lowering the bucket.

At each instant, both the amount of recoverable potential and kinetic energy and the amount of requested potential and kinetic energy of the vehicle needs to be estimated. The total amount of requested energy dictates how much state of charge needs to be available in the accumulators 108, 110, 208, 210, 308, 310, 408, 410, 508, 510, 608, 610, 708, 710, 808, 810, 811. The total amount of recoverable energy dictates how depleted the accumulators 108, 110, 208, 210, 308, 310, 408, 410, 508, 510, 608, 610, 708, 710, 808, 810, 811 may need to be to be able to effectively recover this energy. If the accumulators 108, 110, 208, 210, 308, 310, 408, 410, 508, 510, 608, 610, 708, 710, 808, 810, 811 are not depleted sufficiently, not all recoverable energy can be recovered.

To determine the potential recoverable kinetic energy, the efficiency of the variable displacement pump 118, 218, 318, 417, 517, 617, 717, 816, 817 and the variable displacement motor 120, 220, 320, 419, 519, 520, 619, 719, 819 is taken into account. For example, during a projected braking event the kinetic energy assumed from the equation $\frac{1}{2} mv^2$, where m is the mass of the vehicle and load and v is the velocity of the vehicle, is multiplied by the instantaneous efficiency of the variable displacement pump 118, 218, 318, 417, 517, 617, 717, 816, 817 and the variable displacement motor 120, 220, 320, 419, 519, 520, 619, 719, 819 and integrated over time.

The maximum possible requested kinetic energy at an instantaneous speed equals the energy needed to accelerate the vehicle to top speed starting from the current vehicle speed and is multiplied by the instantaneous efficiency of the variable displacement pump 118, 218, 318, 417, 517, 617, 717, 816, 817 and the variable displacement motor 120, 220, 320, 419, 519, 520, 619, 719, 819 to estimate the required energy for the acceleration event.

As depicted in FIG. 15, consumable and recoverable kinetic energy is a function of vehicle speed. As shown in FIG. 15, at a given vehicle speed the energy required (consumable) to accelerate to top speed and the energy recoverable when braking can be determined. The former sets the minimum state of charge needed for such an acceleration; the latter the maximum state of charge to be able to capture all recoverable energy. The result is that the state of charge for the kinetic energy has a minimum and maximum boundary for optimal efficiency. Since not all kinetic energy can be recovered due to system efficiency, the amount of recoverable energy at each vehicle speed is lower than the required energy to achieve that speed.

Auxiliary attachments that use hydraulic fluid, can provide recoverable potential energy. For example, a front-end loader with a lifted bucket will experience a certain pressure on its hydraulic fluid which is related to available potential energy together with a measure of the height of the bucket (position or angle sensors, or state model of the bucket using hydraulic flow). The efficiency map of the fixed displacement pump 116, 216, 219, 316, 416, 418, 516, 518, 616, 618, 716 is taken into account to estimate the recoverable potential energy. A projected load release event profile is assumed wherein the recoverable potential energy from the auxiliary attachments is multiplied by the instantaneous efficiency of the fixed displacement pump 116, 216, 219, 316, 416, 418, 516, 518, 616, 618, 716 and integrated over time to obtain the total effective recoverable potential energy.

At each instantaneous state of the auxiliary attachments, the maximum possible requested potential energy relates to the maximum allowable load capacity lifted up to the highest lift point. If it is known that there is already a certain load on the auxiliary attachments, the maximum possible requested potential energy relates to lifting that load to the highest lift point. The maximum possible requested potential energy can relate to other attributes of the auxiliary attachments depending on the uses of the auxiliary attachments.

The potential energy state of charge is a function of how much energy is required (consumable) to use the auxiliary attachment at its maximum requirements and how much energy is recoverable when recovering from the hydraulic load at its maximum requirements. The former sets the minimum state of charge needed for such auxiliary circuit usage; the latter is the maximum state of charge to be able to capture all recoverable energy. The result is that the state of charge for the potential energy has a minimum and maximum boundary for optimal efficiency. Since not all potential energy can be recovered due to efficiency, the amount of recoverable energy at each hydraulic fluid pressure is lower than the required energy to achieve that load.

In FIG. 16, the state of charge function upper and lower limits are depicted as a function of vehicle speed and auxiliary attachment potential energy. The upper and lower surfaces indicate the upper and lower limits of the state of charge control function. When the state of charge is controlled to be in between the upper and lower limit at all times, then the accumulator 108, 110, 208, 210, 308, 310, 408, 410, 508, 510, 608, 610, 708, 710, 808, 810, 811 always has potential left to perform an acceleration or use the auxiliary attachment and the accumulators 108, 110, 208, 210, 308, 310, 408, 410, 508, 510, 608, 610, 708, 710, 808, 810, 811 always are depleted enough to be able to store a deceleration action or energy recovery from the auxiliary attachment.

A control strategy can be applied to control the state of charge between the upper or lower limit of the state of charge. Different control strategies can be used to monitor recent vehicle activity and/or estimate the tendency of the vehicle towards the use or the generation of energy. In a first control strategy, a slave controller estimates that the chance that the vehicle is going to decelerate is very high, then the state of charge is controlled towards the lower limit. If the slave controller estimates that the chances of acceleration are high, the state of charge is controlled towards the upper limit. In a second control strategy, the setpoint for the slave controller is the average of the two planes but the slave controller is designed to not exactly track the setpoint as long as the upper or lower limit is not exceeded. In a third control strategy, the slave controller controls towards the lower limit, such that there is always enough empty volume in the accumulator 108, 110, 208, 210, 308, 310, 408, 410, 508, 510, 608, 610, 708, 710, 808, 810, 811 to recuperate the instantaneous kinetic and potential energy.

Figure 10:
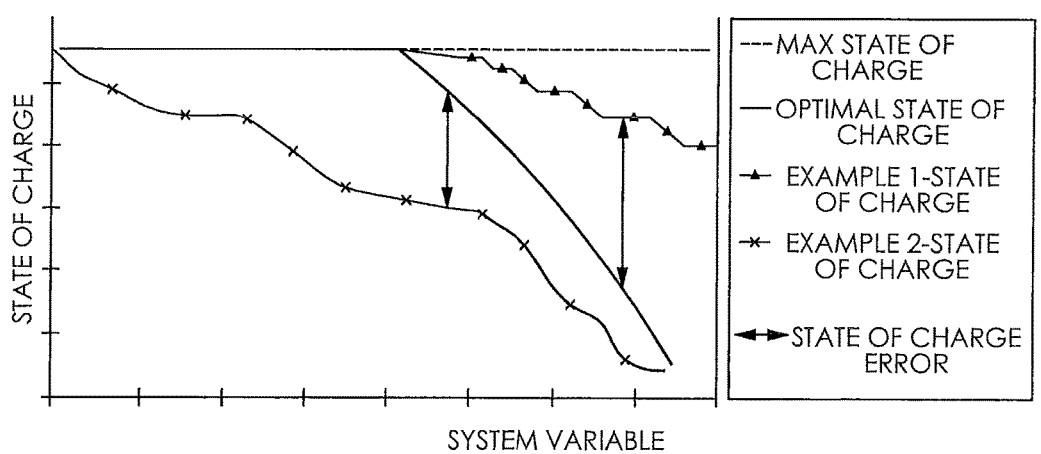
FIG. 10 is a chart illustrating an example of an optimal state of charge control function, a first instantaneous state of charge of the accumulators, a second instantaneous state of charge of the accumulators, and a calculated state of charge error for the first instantaneous state of charge and the second instantaneous state of charge.

To track the optimal state of charge of the accumulators 108, 110, 208, 210, 308, 310, 408, 410, 508, 510, 608, 610, 708, 710, 808, 810, 811, the controller 142, 242, 342, 442, 542, 642, 742, 842 compares an instantaneous state of charge of the accumulators 108, 110, 208, 210, 308, 310, 408, 410, 508, 510, 608, 610, 708, 710, 808, 810, 811 with the optimal state of charge of the accumulators 108, 110, 208, 210, 308, 310, 408, 410, 508, 510, 608, 610, 708, 710, 808, 810, 811, as determined by the optimal state of charge control function for the hydrostatic driveline 100, 200, 300, 400, 500, 600, 700, 800. By comparing the instantaneous state of charge of the accumulators 108, 110, 208, 210, 308, 310, 408, 410, 508, 510, 608, 610, 708, 710, 808, 810, 811 with the optimal state of charge of the accumulators 108, 110, 208, 210, 308, 310, 408, 410, 508, 510, 608, 610, 708, 710, 808, 810, 811, a state of charge error is calculated. As a non-limiting example, FIG. 10 graphically illustrates the state of charge error. A vertical axis is representative of a level of the state of charge of the accumulators 108, 110, 208, 210, 308, 310, 408, 410, 508, 510, 608, 610, 708, 710, 808, 810, 811. A horizontal axis is representative of a system variable of the hydrostatic driveline 100, 200, 300, 400, 500, 600, 700, 800. As a non-limiting example, the system variable may be a speed of the vehicle or a height of a load lifted by the vehicle. If the calculated state of charge error is positive (the accumulators 108, 110, 208, 210, 308, 310, 408, 410, 508, 510, 608, 610, 708, 710, 808, 810, 811 have a state of charge lower than the optimal state of charge), the accumulators 108, 110, 208, 210, 308, 310, 408, 410, 508, 510, 608, 610, 708, 710, 808, 810, 811 are charged by diverting a portion of the hydraulic fluid displaced by the variable displacement pump 118, 318, 717, 817 (or the combination of the fixed displacement pump 219, 418, 518, 618 and the variable displacement pump 218, 417, 517, 617) to the accumulators 108, 110, 208, 210, 308, 310, 408, 410, 508, 510, 608, 610, 708, 710, 808, 810, 811. If the calculated state of charge error is negative (the accumulators 108, 110, 208, 210, 308, 310, 408, 410, 508, 510, 608, 610, 708, 710, 808, 810, 811 have a state of charge higher than the optimal state of charge), the accumulators 108, 110, 208, 210, 308, 310, 408, 410, 508, 510, 608, 610, 708, 710, 808, 810, 811 are released to supplement variable displacement pump 118, 318, 717, 817 (or the combination of the fixed displacement pump 219, 418, 518, 618 and the variable displacement pump 218, 417, 517, 617) in feeding the variable displacement motor 120, 220, 519, 520, 619, 719, 819 (or the combination of the fixed displacement motor 319, 420 and the variable displacement motor 320, 419).

Figure 11:
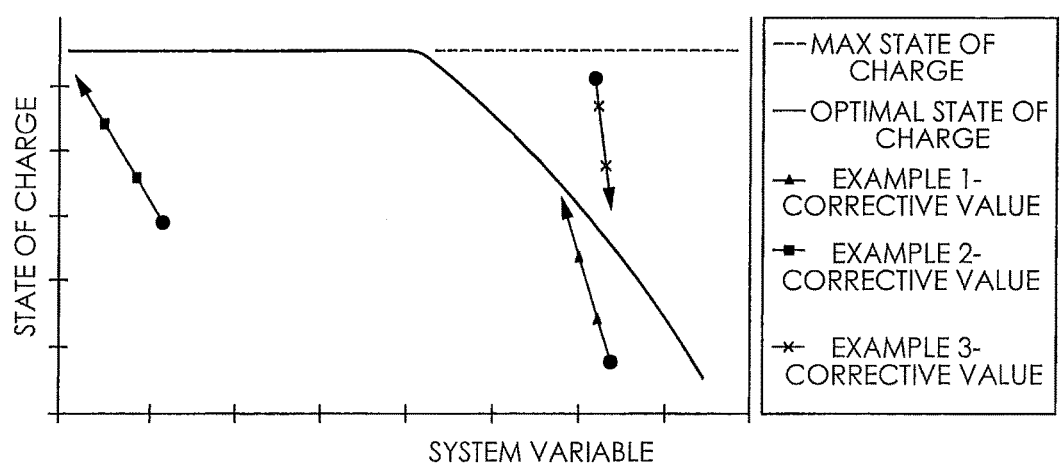
FIG. 11 is a chart illustrating an example of an optimal state of charge function and three examples of corrective values which may be assigned to a response action.

Upon determination of the state of charge error, the controller 142, 242, 342, 442, 542, 642, 742, 842 can utilize a control method including a "fuzzy" logic to return the state of charge of the accumulators 108, 110, 208, 210, 308, 310, 408, 410, 508, 510, 608, 610, 708, 710, 808, 810, 811 to the optimal state of charge of the accumulators 108, 110, 208, 210, 308, 310, 408, 410, 508, 510, 608, 610, 708, 710, 808, 810, 811 as determined by the optimal state of charge control function for the hydrostatic driveline 100, 200, 300, 400, 500, 600, 700, 800. By evaluating the state of charge error in view of a plurality of system variables such as a speed of the vehicle, a torque demand of the vehicle, a height and an amount of a load carried by the vehicle, and whether the state of charge error is positive or negative, a corrective value is assigned to a response action that needs to be taken. It is understood that the plurality of system variables may further include other system variables and that a plurality of variables may be used in a mapping function to determine the corrective value. The response action may be to charge the accumulators 108, 110, 208, 210, 308, 310, 408, 410, 508, 510, 608, 610, 708, 710, 808, 810, 811 or to release the accumulators 108, 110, 208, 210, 308, 310, 408, 410, 508, 510, 608, 610, 708, 710, 808, 810, 811. The corrective value indicates a level of importance of the response action. As a non-limiting example, FIG. 11 graphically illustrates three examples of the corrective values. A vertical axis is representative of a level of the state of charge of the accumulators 108, 110, 208, 210, 308, 310, 408, 410, 508, 510, 608, 610, 708, 710, 808, 810, 811. A horizontal axis is representative of a system variable of the hydrostatic driveline 100, 200, 300, 400, 500, 600, 700, 800. As a non-limiting example, the system variable may be a speed of the vehicle or a height of a load lifted by the vehicle. As non-limiting examples, FIG. 11 illustrates if the system variable is high and the state of charge of the accumulators 108, 110, 208, 210, 308, 310, 408, 410, 508, 510, 608, 610, 708, 710, 808, 810, 811 is about 30% of the optimal state of charge of the accumulators 108, 110, 208, 210, 308, 310, 408, 410, 508, 510, 608, 610, 708, 710, 808, 810, 811, then the controller 142, 242, 342, 442, 542, 642, 742, 842 applies a corrective value of 0.3 (Example 1, a low priority to raise the state of charge of the accumulators 108, 110, 208, 210, 308, 310, 408, 410, 508, 510, 608, 610, 708, 710, 808, 810, 811), if the system variable is low and the state of charge of the accumulators 108, 110, 208, 210, 308, 310, 408, 410, 508, 510, 608, 610, 708, 710, 808, 810, 811 is about 50% of the optimal state of charge of the accumulators 108, 110, 208, 210, 308, 310, 408, 410, 508, 510, 608, 610, 708, 710, 808, 810, 811, then the controller 142, 242, 342, 442, 542, 642, 742, 842 applies a corrective value of 0.7 (Example 2, a high priority to raise the state of charge of the accumulators 108, 110, 208, 210, 308, 310, 408, 410, 508, 510, 608, 610, 708, 710, 808, 810, 811), and if the system variable is high and the state of charge of the accumulators 108, 110, 208, 210, 308, 310, 408, 410, 508, 510, 608, 610, 708, 710, 808, 810, 811 is about 190% of the optimal state of charge of the accumulators 108, 110, 208, 210, 308, 310, 408, 410, 508, 510, 608, 610, 708, 710, 808, 810, 811, then the controller 142, 242, 342, 442, 542, 642, 742, 842 applies a corrective value of 0.7 (Example 3, a high priority to lower the state of charge of the accumulators 108, 110, 208, 210, 308, 310, 408, 410, 508, 510, 608, 610, 708, 710, 808, 810, 811).

In accordance with the provisions of the patent statutes, the present disclosure has been described in what is considered to represent its preferred embodiments. However, it should be noted that the disclosure can be practiced otherwise than as specifically illustrated and described without departing from its spirit or scope.

What is claimed is:

1. A method for determining an optimal state of charge control function for a hydrostatic accumulator and employing a control system to adjust a state of charge of the hydrostatic accumulator to track an optimal state of charge, comprising the steps of:

providing a hydrostatic driveline for a vehicle including a power source, a pump drivingly engaged with the power source, a motor, and the hydrostatic accumulator, wherein the pump, the motor, and the hydrostatic accumulator form a portion of a fluidic circuit;

providing a controller in communication with a plurality of inputs;

determining the optimal state of charge control function using the controller, wherein the controller compares at least one of the plurality of inputs to at least one of a plurality of inputs of an optimal state of charge control function look-up table;

calculating the optimal state of charge of the hydrostatic accumulator using the optimal state of charge control function and at least a portion of the plurality of inputs provided to the controller;

comparing the state of charge of the hydrostatic accumulator to the optimal state of charge of the hydrostatic accumulator as calculated using the optimal state of charge control function to determine a state of charge error;

calculating a corrective value for the state of charge using the state of charge error, and the at least a portion of the plurality of inputs provided to the controller; and adjusting the state of charge of the hydrostatic accumulator based on the corrective value and the state of charge error, the state of charge of the hydrostatic accumulator adjusted by charging the hydrostatic accumulator using one of the pump and the motor or discharging the hydrostatic accumulator.

2. The method according to claim 1, wherein the plurality of inputs provided to the controller include at least one of driver behavior, maximum acceleration, mean acceleration, maximum deceleration, number of accelerations, number of changes of direction, maximum speed, a rate of fluid transfer to or from the hydrostatic accumulator, a state of charge of the hydrostatic accumulator, a power demand of the vehicle, frequency of activation of a braking system and an intensity of activation of a braking system.

3. The method according to claim 2, wherein the look-up table includes at least one of the plurality of inputs provided to the controller measured during a duty cycle.

4. The method according to claim 1, wherein the optimal state of charge control function in the look up table is determined using an optimization algorithm based on measured values of the at least one of the plurality of inputs provided to the controller during a duty cycle and a cost function of energy usage of the duty cycle.

5. The method according to claim 4, wherein the algorithm includes dynamic programming.

6. A method for determining an optimal state of charge control function for a hydrostatic accumulator and employing a control system to adjust a state of charge of the hydrostatic accumulator to track an optimal state of charge, comprising the steps of:

providing a hydrostatic driveline for a vehicle including a power source, a pump drivingly engaged with the power source, a motor, and the hydrostatic accumulator, wherein the pump, the motor, and the hydrostatic accumulator form a portion of a fluidic circuit;

providing a controller in communication with a plurality of inputs;

determining the optimal state of charge control function using the controller, wherein the controller uses adaptive control based on changes in a state of charge of the hydrostatic driveline during a cycle of operation of the driveline to determine the optimal state of charge control function;

calculating the optimal state of charge of the hydrostatic accumulator using the optimal state of charge control function and at least a portion of the plurality of inputs provided to the controller;

comparing the state of charge of the hydrostatic accumulator to the optimal state of charge as calculated using the optimal state of charge control function to determine a state of charge error;

calculating a corrective value for the state of charge using the state of charge error, and the at least a portion of the plurality of inputs provided to the controller; and adjusting the state of charge of the hydrostatic accumulator based on the corrective value and the state of charge error, the state of charge of the hydrostatic accumulator adjusted by charging the hydrostatic accumulator using one of the pump and the motor or discharging the hydrostatic accumulator.

7. The method according to claim 6, wherein the cycle of operation is a duty cycle.

8. The method according to claim 6, wherein the plurality of inputs provided to the controller include at least one of driver behavior, maximum acceleration, mean acceleration, maximum deceleration, number of accelerations, number of changes of direction, maximum speed, a rate of fluid transfer to or from the hydrostatic accumulator, a state of charge of the hydrostatic accumulator, a power demand of the vehicle, frequency of activation of a braking system and an intensity of activation of a braking system.

9. A method for determining an optimal state of charge control function for a hydrostatic accumulator and employing a control system to adjust a state of charge of the hydrostatic accumulator to track an optimal state of charge, comprising the steps of:

providing a hydrostatic driveline for a vehicle including a power source, a pump drivingly engaged with the power source, a motor, and the hydrostatic accumulator, wherein the pump, the motor, and the hydrostatic accumulator form a portion of a fluidic circuit;

providing a controller in communication with a plurality of inputs;

determining the optimal state of charge control function with using the controller, wherein the controller uses upper and lower limits of available energy of the hydrostatic driveline to calculate the optimal state of charge control function;

calculating the optimal state of charge of the hydrostatic accumulator using the optimal state of charge control function and at least a portion of the plurality of inputs provided to the controller;

comparing the state of charge of the hydrostatic accumulator to the optimal state of charge as calculated using the optimal state of charge control function to determine a state of charge error;

calculating a corrective value for the state of charge using the state of charge error, and the at least a portion of the plurality of inputs provided to the controller; and adjusting the state of charge of the hydrostatic accumulator based on the corrective value and the state of charge error, the state of charge of the hydrostatic accumulator adjusted by charging the hydrostatic accumulator using one of the pump and the motor or discharging the hydrostatic accumulator.

10. The method according to claim 9, wherein the plurality of inputs include at least one of driver behavior, maximum acceleration, mean acceleration, maximum deceleration, number of accelerations, number of changes of direction, maximum speed, a rate of fluid transfer to or from the hydrostatic accumulator, a state of charge of the hydrostatic accumulator, a power demand of the vehicle, frequency of activation of a braking system and an intensity of activation of a braking system.

11. The method according to claim 9, further comprising the step of using a control strategy to limit the state of charge of the hydrostatic accumulator between the upper and lower limits of available energy.

12. A method for minimizing a fuel consumption rate of a vehicle having a hydrostatic driveline, the method comprising the steps of:
- providing a variable displacement motor;
- determining an efficiency of the variable displacement motor using a motor efficiency map;
- providing a variable displacement pump;
- determining an efficiency of the variable displacement pump using a pump efficiency map;
- providing a power source, a capacity of the power source based on a desired power output of the vehicle, the efficiency of the variable displacement motor, and the efficiency of the variable displacement pump;
- providing a controller; and
- controlling a fluid displacement and an output pressure of the variable displacement motor independent of a fluid displacement of the pump with the controller, wherein the controller employs the efficiency of the variable displacement motor and the efficiency of the variable displacement pump to minimize the fuel consumption rate of the vehicle.

13. The method according to claim 12, wherein the efficiency map of the variable displacement pump is a function of at least a speed, the fluid displacement, and an operating pressure of the variable displacement pump.

14. The method according to claim 12, wherein the efficiency map of the variable displacement motor is a function of at least a speed, the fluid displacement, and an output pressure of the variable displacement motor.

15. The method according to claim 12, wherein the efficiency maps are stored in the controller.

* * * * *